United States Patent
Otsuka et al.

(10) Patent No.: US 11,628,483 B2
(45) Date of Patent: Apr. 18, 2023

(54) HOT STAMPING FORMED ARTICLE AND METHOD AND DEVICE FOR MANUFACTURING HOT STAMPING FORMED ARTICLE

(71) Applicant: NIPPON STEEL CORPORATION, Tokyo (JP)

(72) Inventors: Kenichiro Otsuka, Tokyo (JP); Yoshiyuki Kaseda, Tokyo (JP); Yoshiaki Nakazawa, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 472 days.

(21) Appl. No.: 16/642,837

(22) PCT Filed: Sep. 8, 2017

(86) PCT No.: PCT/JP2017/032517
§ 371 (c)(1),
(2) Date: Feb. 27, 2020

(87) PCT Pub. No.: WO2019/049322
PCT Pub. Date: Mar. 14, 2019

(65) Prior Publication Data
US 2020/0346267 A1 Nov. 5, 2020

(51) Int. Cl.
*B21D 22/02* (2006.01)
*B62D 25/04* (2006.01)
*B62D 29/00* (2006.01)

(52) U.S. Cl.
CPC .......... *B21D 22/022* (2013.01); *B62D 25/04* (2013.01); *B62D 29/007* (2013.01)

(58) Field of Classification Search
CPC ...... B21D 22/02; B21D 22/022; B21D 22/06; B21D 22/10; B21D 22/12; B21D 22/20;
(Continued)

(56) References Cited

U.S. PATENT DOCUMENTS 5,735,163 A  4/1998 Sata et al.
6,120,089 A  9/2000 Kalstiantz et al.
(Continued)

FOREIGN PATENT DOCUMENTS

EP  1 138 406 A2  10/2001
EP  2 946 845 A1  11/2015
(Continued)

OTHER PUBLICATIONS

English Translation of JP2017-159359 from the EPO dated Aug. 27, 2022. (Year: 2022).*

(Continued)

*Primary Examiner* — Adam Krupicka
(74) *Attorney, Agent, or Firm* — Birch, Stewart, Kolasch & Birch, LLP

(57) ABSTRACT

The present invention provides a hot-stamping formed article made of steel, in which the hot-stamping formed article has at least one of a tensile strength of 1200 MPa or more and a martensitic steel structure and includes a first portion, a corner portion, and a second portion, which are sequentially continuous from one end portion to the other end portion in a longitudinal direction, each of the first portion, the corner portion, and the second portion includes a top sheet and two vertical walls connected to the top sheet when viewed in a cross section perpendicular to the longitudinal direction, the second portion includes a first outwardly-extending flange adjacent to the vertical wall, and the corner portion includes a vertical flange extending from the vertical wall of the first portion, a second outwardly-extending flange adjacent to the vertical wall located on an outer peripheral side of the corner portion out of the two vertical walls, and a transition portion in which the vertical flange and the second outwardly-extending flange are continuous.

11 Claims, 30 Drawing Sheets

(58) Field of Classification Search
CPC .... B21D 22/206; B21D 22/208; B21D 22/21; B21D 22/26; B62D 25/04
See application file for complete search history.

(56) References Cited

U.S. PATENT DOCUMENTS

| | | |
|---|---|---|
| 2010/0186476 A1 | 7/2010 | Yamada |
| 2014/0147693 A1 | 5/2014 | Yasuyama et al. |
| 2015/0336619 A1 | 11/2015 | Tanaka et al. |
| 2016/0221068 A1 | 8/2016 | Tanaka et al. |
| 2016/0296989 A1 | 10/2016 | Nishimura et al. |
| 2018/0001368 A1 | 1/2018 | Otsuka et al. |

FOREIGN PATENT DOCUMENTS

| | | |
|---|---|---|
| EP | 3 088 093 A1 | 11/2016 |
| JP | 5-57364 A | 3/1993 |
| JP | 8-117879 A | 5/1996 |
| JP | 10-316028 A | 12/1998 |
| JP | 2000-272538 A | 10/2000 |
| JP | 2005-212533 A | 8/2005 |
| JP | 2009-241082 A | 10/2009 |
| JP | 2011-50971 A | 3/2011 |
| JP | 2011-147970 A | 8/2011 |
| JP | 2012-24837 A | 2/2012 |
| JP | 2016-68729 A | 5/2016 |
| JP | 2017-6926 A | 1/2017 |
| JP | 2017-159359 A | 9/2017 |
| JP | 2017159359 A * | 9/2017 |
| WO | WO 2012/036262 A1 | 3/2012 |
| WO | WO 2014/106932 A1 | 7/2014 |
| WO | WO 2015/046023 A1 | 4/2015 |
| WO | WO 2015/083367 A1 | 6/2015 |
| WO | WO 2016/103682 A1 | 6/2016 |

OTHER PUBLICATIONS

International Search Report for PCT/JP2017/032517 (PCT/ISA/210) dated Nov. 7, 2017.
Written Opinion of the International Searching Authority for PCT/JP2017/032517 (PCT/ISA/237) dated Nov. 7, 2017.

* cited by examiner (a)

(b)

(c)

(a)   (b)   (c)

(a)   (b)   (c)

(a)   (b)   (c)

(a)          (b)          (c)

(a)          (b)          (c)

(a)          (b)          (c)

(a) (b)

HOT STAMPING FORMED ARTICLE AND METHOD AND DEVICE FOR MANUFACTURING HOT STAMPING FORMED ARTICLE

TECHNICAL FIELD OF THE INVENTION

The present invention relates to a hot-stamping formed article, and a method and a device for manufacturing the same.

RELATED ART

In order to improve the fuel efficiency by a reduction in the weight of a vehicle body and improve the collision safety of the vehicle body, high-strengthening of a steel sheet forming the vehicle body has proceeded.

FIG. 36 is a perspective view showing an example of a lower A pillar outer panel 1 which is a component of a bodyside in a bodyshell of a vehicle. As shown in FIG. 36, the lower A pillar outer panel 1 includes a corner portion 2 at its upper portion. The corner portion 2 includes a vertical wall 3 which is perpendicular to a vehicle front-rear direction and a vertical wall 4 which is substantially perpendicular to a vehicle up-down direction.

An edge of the vertical wall 3 perpendicular to the vehicle front-rear direction is provided with an outwardly-extending flange 3a to be overlapped with and joined to a lower A pillar inner panel 5. On the other hand, the vertical wall 4 substantially perpendicular to the vehicle up-down direction serves as a windshield mounting surface. Therefore, an edge of the vertical wall 4 is not provided with an outwardly-extending flange and is formed only by the vertical wall 4. In the present specification, the vertical wall 4 is also referred to as a "glass surface flange".

(a) of FIG. 37 and (b) of FIG. 37 are explanatory views showing a two-step cold forming method of the lower A pillar outer panel 1 in the related art.

In the related art, as shown in (a) of FIG. 37, in a first step, the outwardly-extending flanges 3a and 4a are respectively drawn from the two vertical walls 3 and 4 in the corner portion 2, and thereafter, as shown in (b) of FIG. 37, in a second step, the outwardly-extending flange 4a of the vertical wall 4 substantially perpendicular to the vehicle up-down direction is bent back, whereby the lower A pillar outer panel 1 is cold-formed by the two steps.

However, high-strengthening (for example, tensile strength 1200 MPa or more) and formability of a steel sheet have a contradictory relationship with each other, and it is difficult to manufacture a lower A pillar outer panel 1 which includes two vertical walls 3 and 4 without the generation of cracks and wrinkles and has higher strength. In addition, since the forming is performed in the two steps, manufacturing costs increase.

In recent years, by a hot stamping method in which a steel blank, which is a forming material of the lower A pillar outer panel 1, is heated to a temperature of $Ac_3$ point or higher, thereafter formed with a press die, and then subjected to heat removal and quenching, a lower A pillar outer panel 1 which includes two vertical walls 3 and 4 in a corner portion 2 and has higher strength is manufactured.

FIG. 38 is an explanatory view showing a situation in which a lower A pillar outer panel 1 including vertical walls 3 and 4 in a corner portion 2 is drawn in one step by a cold forming or hot stamping method based on a press forming method of a door inner panel having an extra portion disclosed in, for example, Patent Document 1. FIG. 39 is an explanatory view showing the vicinity of the corner portion of the lower A pillar outer panel 1 formed before trimming.

As shown in FIGS. 38 and 39, in the press forming method of the door inner panel having the extra portion, a blank 9 is provided with an extra portion 60 and drawn using a die 6, a punch 7, and a blank holder 8. Thereafter, the extra portion 60 which is an unnecessary portion is cut along a trim line 61 indicated by broken line in FIG. 39 while leaving the article shape portion, whereby the lower A pillar outer panel 1 is formed in one step. In particular, in a case where a press-formed article is manufactured by the hot stamping method, it is necessary to form the press-formed article in one step as much as possible from the viewpoint of manufacturing costs.

However, in this press forming method, since the extra portion 60 is provided, the forming depth of the lower A pillar outer panel 1 is necessarily increased. For this reason, it is difficult to manufacture a lower A pillar outer panel 1 having a small radius of curvature in a corner or a lower A pillar outer panel 1 having a small bending radius of curvature, which has a high forming difficulty.

When drawing is performed in the hot stamping method, a portion formed into a flange adjacent to a pressed portion 9a of the blank 9 sandwiched between the die 6 and the blank holder 8 is rapidly cooled at an initial stage of hot stamping, and movement of the material to portions formed into the vertical walls 3 and 4 is impeded. Therefore, cracks are generated early in ridge lines 3b and 4b connected to the vertical walls 3 and 4 in FIG. 39. For example, the sheet thickness reduction ratios of joint portions of the ridge lines 3b and 4b reach 26%. For this reason, the radii of curvature of the ridge lines 3b and 4b cannot be made small.

FIG. 40 is an explanatory view showing a situation in which a lower A pillar outer panel 1 including vertical walls 3 and 4 in a corner portion 2 is subjected to bending forming in one step by a cold forming or hot stamping method. (a) of FIG. 41 is an explanatory view showing the vicinity of the corner portion 2 of the lower A pillar outer panel 1 subjected to the bending forming, and (b) of FIG. 41 is an explanatory view showing the lower A pillar outer panel 1 provided with a cutout part 64 in the vicinity of the corner portion 2.

As shown in FIGS. 40 and 41, by pressing a pad pressed portion 63 with a pad 62 and performing bending forming on a blank 9 using a die 6, a punch 7, and the pad 62, the lower A pillar outer panel 1 can be formed in one step.

However, since the corner portion 2 shrinks and undergoes flange deformation, when the lower A pillar outer panel 1 is subjected to the bending forming in one process, excessive wrinkles (in some cases, overlapping wrinkles) are generated in the vertical wall 4 of the corner portion 2. In the invention of Patent Document 2, an attempt is made to suppress the generation of wrinkles in the corner portion or the like by drawing one side of the corner portion.

However, the sheet thickness reduction ratio of the vertical wall 4 of the corner portion 2 reaches, for example, 25%.

For this reason, in a case where the lower A pillar outer panel 1 is manufactured by the bending forming using the hot stamping method, the blank 9 has to be designed so that the cutout part 64 is formed in the vicinity of the corner portion 2 as shown in (b) of FIG. 41, and the lower A pillar outer panel 1 having a desired shape cannot be manufactured.

Patent Document 3 discloses a technique for suppressing cracks and wrinkles of a steel sheet using a servo die cushion. Patent Document 4 discloses a technique for suppressing cracks and wrinkles by defining a die structure that controls the clearance between upper and lower dies during forming.

The servo die cushion used by the invention disclosed in Patent Document 3 is not only expensive but also complex to be controlled. For this reason, in the invention disclosed by Patent Document 3, cracks and wrinkles cannot be suppressed cheaply and simply.

Furthermore, even if the clearance between portions of the die and punch between which a flange is sandwiched is controlled by the dies used in the invention disclosed in Patent Document 4, wrinkles cannot be completely suppressed.

As described above, in the techniques of the related art, a lower A pillar outer panel having a tensile strength of 1200 MPa or more cannot be formed without causing cracks or wrinkles to be generated in one step by the hot stamping method.

PRIOR ART DOCUMENT

Patent Document

[Patent Document 1] Japanese Unexamined Patent Application, First Publication No. 2005-212533
[Patent Document 2] Japanese Unexamined Patent Application, First Publication No. 2012-24837
[Patent Document 3] Japanese Unexamined Patent Application, First Publication No. 2011-50971
[Patent Document 4] Japanese Unexamined Patent Application, First Publication No. 2011-147970

DISCLOSURE OF THE INVENTION

Problems to be Solved by the Invention

The present invention has been made in view of the above-described problems associated with the related art, and an object thereof is to provide a hot-stamping formed article having high collision characteristics and rigidity while having a thin sheet thickness and a light weight, and a method and a device for manufacturing the hot-stamping formed article in which the hot-stamping formed article can be manufactured.

Means for Solving the Problem (1) A hot-stamping formed article according to an aspect of the present invention is a hot-stamping formed article made of steel, in which the hot-stamping formed article has at least one of a tensile strength of 1200 MPa or more and a martensitic steel structure and includes a first portion, a corner portion, and a second portion, which are sequentially continuous from one end portion to the other end portion in a longitudinal direction, each of the first portion, the corner portion, and the second portion includes a top sheet and two vertical walls connected to the top sheet when viewed in a cross section perpendicular to the longitudinal direction, the second portion includes a first outwardly-extending flange adjacent to the vertical wall, and the corner portion includes a vertical flange extending from the vertical wall of the first portion, a second outwardly-extending flange adjacent to the vertical wall located on an outer peripheral side of the corner portion out of the two vertical walls, and a transition portion in which the vertical flange and the second outwardly-extending flange are continuous.

According to the hot-stamping formed article having the above-described configuration, it is possible to provide a hot-stamping formed article having high collision characteristics and rigidity while having a thin sheet thickness and a light weight by providing a transition portion in which a vertical flange and a second outwardly-extending flange are continuous in a corner portion of the hot-stamping formed article having at least one of a tensile strength of 1200 MPa or more and a martensitic steel structure.

(2) The hot-stamping formed article according to (1) may be a lower A pillar outer panel.

(3) A method for manufacturing a hot-stamping formed article according to another aspect of the present invention is a method for manufacturing the hot-stamping formed article according to (1) or (2) by performing press forming on a blank by a hot stamping method, the method including: disposing the blank between a punch and a blank holder, a die disposed to face the blank holder, and a bending die; supporting a portion of the blank which is to be formed into the top sheet by the punch; sandwiching at least a part of a portion of the blank which is to be formed into the vertical wall located on the outer peripheral side of the corner portion out of the two vertical walls in the first portion and the corner portion between the blank holder and the die; and performing drawing on at least the part of the portion which is to be formed into the vertical wall by the punch, the blank holder and the die by moving the die and the bending die relatively close to the punch, and performing bending forming on a remaining part excluding the part to be drawn by the punch and the bending die.

According to the method for manufacturing a hot-stamping formed article having the above-described configuration, when a hot-stamping formed article having at least one of a tensile strength of 1200 MPa or more and a martensitic steel structure is manufactured, a hot-stamping formed article having a transition portion in which a vertical flange and a second outwardly-extending flange are continuous in a corner portion can be manufactured. This hot-stamping formed article has high collision characteristics and rigidity while being thin and lightweight.

(4) In the method for manufacturing the hot-stamping formed article according to (3), a configuration in which at least a part of the portion of the blank which is to be formed into the vertical wall located on the outer peripheral side of the corner portion and the vertical flange is drawn out before reaching a bottom dead center, and sandwiching by the blank holder and the die is finished may be adopted.

(5) The method for manufacturing the hot-stamping formed article according to (3) or (4) may further include: a pad disposed to face the punch, in which a configuration in which the portion of the blank which is to be formed into the top sheet is sandwiched between the punch and the pad may be adopted.

(6) In method for manufacturing the hot-stamping formed article according to any one of (3) to (5), a configuration in which the die and the blank holder respectively include first surfaces which abut on and sandwich the portion of the blank which is to be formed into the vertical wall located on the outer peripheral side of the corner portion out of the two vertical walls in the first portion and the corner portion, bent portions continuous to the first surfaces, and second surfaces which are continuous to the bent portions and are inclined in a direction away from the bending die with respect to the first surfaces, and the second surface of each of the die and the blank holder performs drawing on the blank along with bending forming by the punch and the bending die may be adopted.

(7) In the method for manufacturing the hot-stamping formed article according to (6), a configuration in which a difference in a pressing direction between an end portion of a portion of the blank restrained by each of the second surfaces of the die and the blank holder during forming and an end portion of a portion which is subjected to the bending forming by the punch and the bending die and is to become the first outwardly-extending flange is 20 mm or less may be adopted.

(8) In the method for manufacturing the hot-stamping formed article according to (6) or (7), a configuration in which the bent portion of the die is provided at a height position in the vicinity of a height position of a bending ridge line portion of the bending die, and the bent portion of the blank holder is provided at a height position in the vicinity of a height position of a punch shoulder radius portion of the punch may be adopted.

(9) In the method for manufacturing the hot-stamping formed article according to any one of (6) to (8), a configuration in which an inclination angle of the second surface with respect to the first surface in the blank holder is equal to or more than (an inclination angle of a punch shoulder radius portion of the punch−30 degrees) and equal to or less than (the inclination angle of the punch shoulder radius portion of the punch+30 degrees) may be adopted.

(10) In the method for manufacturing the hot-stamping formed article according to any one of (6) to (9), a configuration in which the first surface of the blank holder is present at a height position substantially coincident with a height position of a punch bottom surface of the punch when the blank is sandwiched between the die and the blank holder may be adopted.

(11) In the method for manufacturing the hot-stamping formed article according to any one of (6) to (10), a configuration in which the first surface of the die is present at a height position substantially coincident with a height position of a plane on which a bending ridge line portion of the bending die is present when the blank is sandwiched between the die and the blank holder may be adopted.

(12) A device for manufacturing a hot-stamping formed article according to still another aspect of the present invention is a device for manufacturing the hot-stamping formed article according to (1) or (2) by performing press forming on a blank by a hot stamping method, the device including: a punch and a blank holder; a die disposed to face the blank holder; and a bending die, in which the die and the bending die, and the punch are moved relatively close to and away from each other, the punch supports a portion of the blank which is to be formed into the top sheet, at least a part of a portion of the blank which is to be formed into the vertical wall located on the outer peripheral side of the corner portion out of the two vertical walls in the first portion and the corner portion is sandwiched between the blank holder and the die, and at least the part of the portion which is to be formed into the vertical wall located on the outer peripheral side of the corner portion is drawn by the punch, the blank holder and the die, and a remaining part excluding the part to be drawn is subjected to bending forming by the punch and the bending die.

By using the device for manufacturing the hot-stamping formed article having the above-described configuration, it is possible to manufacture a hot-stamping formed article which has at least one of a tensile strength of 1200 MPa or more and a martensitic steel structure and a transition portion in which a vertical flange and a second outwardly-extending flange are continuous in a corner portion. This stamping formed article has high collision characteristics and rigidity while having a thin sheet thickness and a light weight.

(13) In the device for manufacturing the hot-stamping formed article according to (12), a configuration in which sandwiching of at least the part of the portion of the blank which is to be formed into the vertical wall located on the outer peripheral side of the corner portion out of the two vertical walls in the first portion and the corner portion between the blank holder and the die is finished by drawing-out before reaching a bottom dead center may be adopted.

(14) The device for manufacturing the hot-stamping formed article according to (12) or (13) may further include: a pad disposed to face the punch, in which a configuration in which the punch and the pad sandwich the portion of the blank which is to be formed into the top sheet may be adopted.

(15) In the device for manufacturing the hot-stamping formed article according to any one of (12) to (14), a configuration in which the die and the blank holder respectively include first surfaces which abut on and sandwich the portion of the blank which is to be formed into the vertical wall located on the outer peripheral side of the corner portion out of the two vertical walls in the first portion and the corner portion, bent portions continuous to the first surfaces, and second surfaces which are continuous to the bent portions and are inclined in a direction away from the bending die with respect to the first surfaces may be adopted.

(16) In the device for manufacturing the hot-stamping formed article according to (15), a configuration in which the bent portion of the die is provided at a height position in the vicinity of a height position of a bending ridge line portion of the bending die, and the bent portion of the blank holder is provided at a height position in the vicinity of a height position of a punch shoulder radius portion of the punch may be adopted.

(17) In the device for manufacturing the hot-stamping formed article according to (15) or (16), a configuration in which an inclination angle of the second surface with respect to the first surface in the blank holder is equal to or more than (an inclination angle of a punch shoulder radius portion of the punch−30 degrees) and equal to or less than (the inclination angle of the punch shoulder radius portion of the punch+30 degrees) may be adopted.

(18) In the device for manufacturing the hot-stamping formed article according to any one of (15) to (17), a configuration in which the first surface of the blank holder is present at a height position substantially coincident with a height position of a punch bottom surface of the punch when the blank is sandwiched between the die and the blank holder may be adopted.

(19) In the device for manufacturing the hot-stamping formed article according to any one of (15) to (18), a configuration in which the first surface of the die is present at a height position substantially coincident with a height position of a plane on which a bending ridge line portion of the bending die is present when the blank is sandwiched between the die and the blank holder may be adopted.

Effects of the Invention

According to the present invention, it is possible to provide a hot-stamping formed article having high collision characteristics and rigidity while having a thin sheet thickness and a light weight. Furthermore, according to the present invention, it is possible to provide a method and a device for manufacturing a hot-stamping formed article in which the hot-stamping formed article having high collision characteristics and rigidity while having a thin sheet thickness and a light weight can be manufactured.

Figure 41:
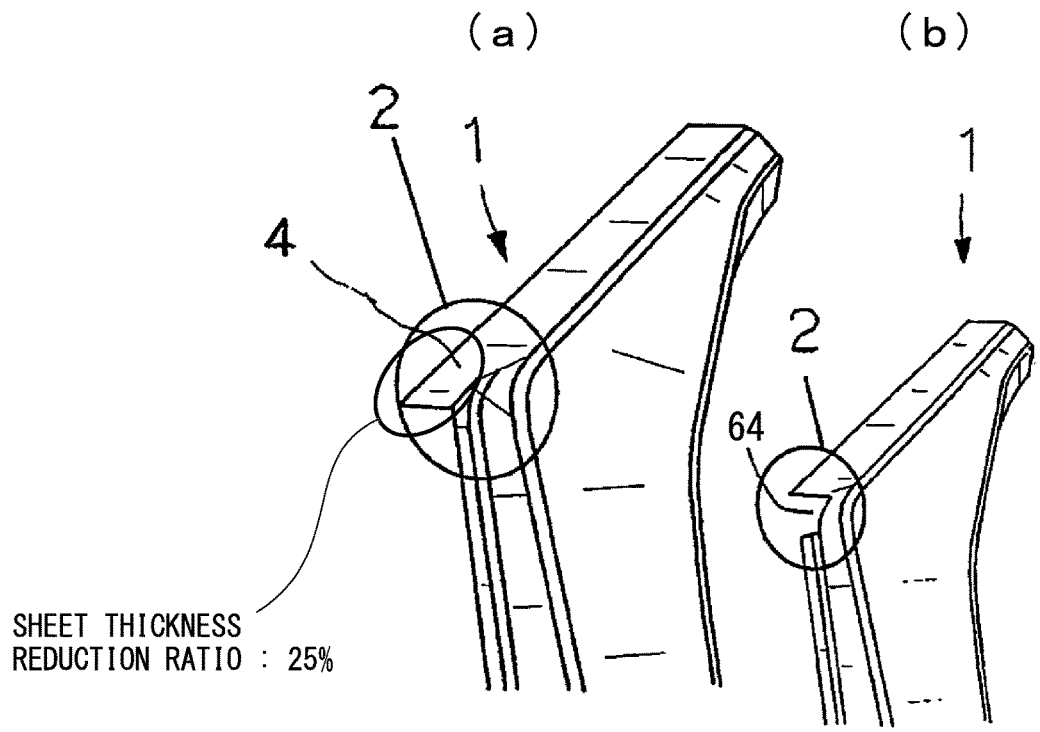

(a) of FIG. 41 is an explanatory view showing the vicinity of the corner portion of the lower A pillar outer panel subjected to the bending forming, and (b) of FIG. 41 is an explanatory view showing the lower A pillar outer panel provided with a cutout part in the vicinity of the corner portion.

EMBODIMENTS OF THE INVENTION

Figure 39:
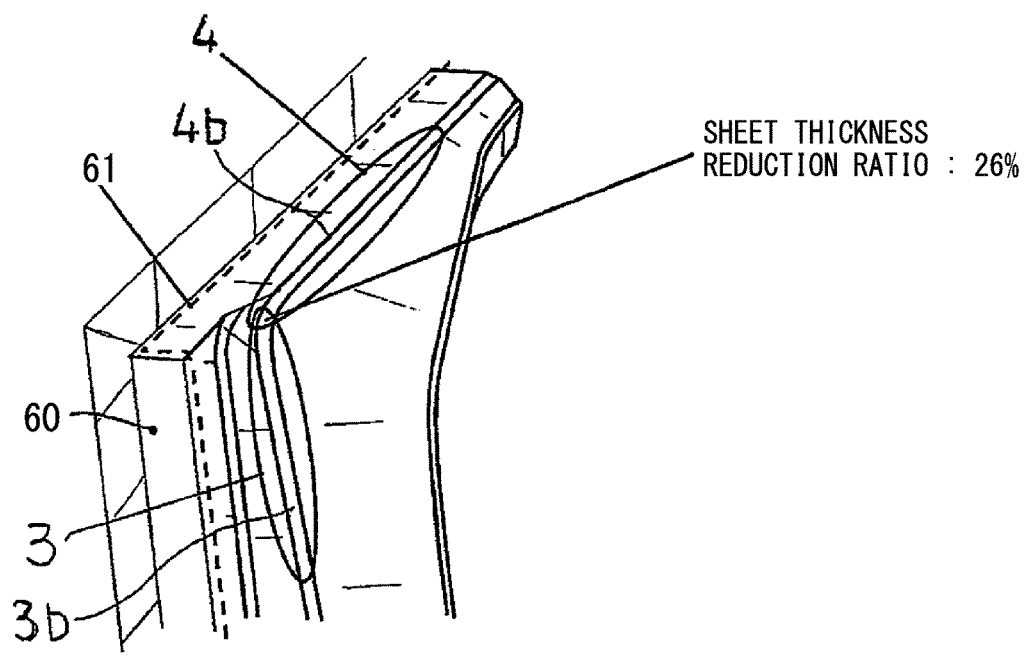
FIG. 39 is an explanatory view showing the vicinity of a corner portion of the lower A pillar outer panel formed before trimming.
Figure 40:
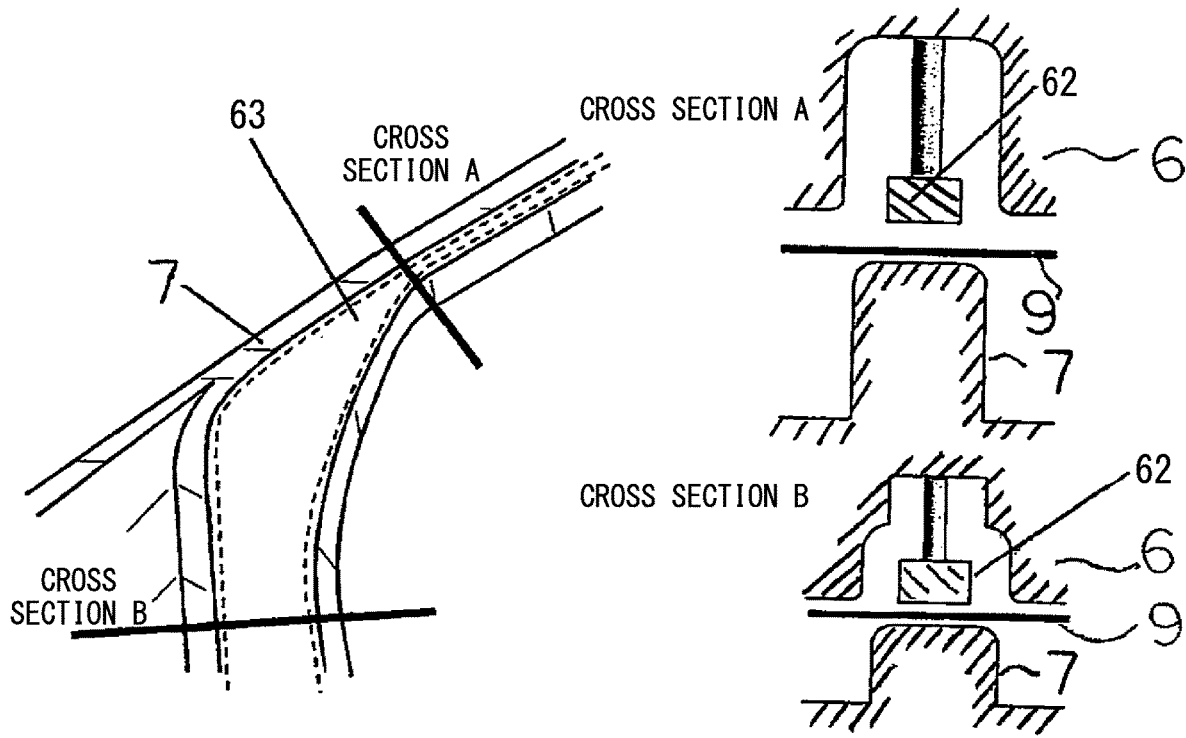
FIG. 40 is an explanatory view showing a situation in which a lower A pillar outer panel having vertical walls in a corner portion is subjected to bending forming in one step by a cold forming or hot stamping method.

As described above, in a case where a blank is formed into the above-described hot-stamping formed article by the hot stamping method, when drawing is performed, cracks are generated early in the ridge lines 3b and 4b connected to the vertical walls 3 and 4 in the corner portion shown in FIG. 39. On the other hand, when bending forming is performed, excessive wrinkles (in some cases, overlapping wrinkles) are generated in the vertical wall 4 of the corner portion 2 shown in (a) of FIG. 41.

As a result of intensive examinations to solve the above problems, the present inventors obtained the following novel findings (A) to (D) and completed the present invention.

(A) For forming the vertical wall 4 of the corner portion 2 shown in (a) of FIG. 41 where excessive wrinkles are generated when bending forming is performed, drawing is performed using a blank holder, whereby the amount of the inflow of a material can be controlled and the generation of wrinkles can be prevented.

(B) For forming portions other than the vertical wall 4 of the corner portion 2 shown in (a) of FIG. 41 where excessive wrinkles are generated when bending forming is performed, bending forming is performed without using the blank holder, whereby the movement of the material in the blank from a portion which is to be formed into a flange to a portion which is to be formed into the vertical wall 4 can be promoted, and the generation of cracks can be prevented.

(C) That is, by using bending drawing combined forming in which bending forming and drawing are combined, the above-mentioned hot-stamping formed article can be formed in one step by a hot stamping method.

(D) Formability can be further improved by devising the shapes of a die and a blank holder used for the drawing.

Hereinafter, various embodiments of the present invention will be described with reference to the drawings, but it is obvious that the present invention is not limited only to these embodiments.

In the present invention, a "locking mechanism" is necessary in a case where a pad is used and a drawn flange is in a state of being sandwiched between a blank holder and a die at a bottom dead center, that is, in a state of being sandwiched between upper and lower dies. The locking mechanism is a mechanism that mechanically or electrically controls (locks) a rise of the blank holder when the die is lifted after the bottom dead center with the pad in a state of pressing a top sheet of a formed article.

First Embodiment

Hereinafter, a hot-stamping formed article according to the present embodiment, and a method and a device for manufacturing the same will be sequentially described with reference to the accompanying drawings. In the following description, a case where the hot-stamping formed article is a lower A pillar outer panel is taken as an example, but the present invention is not limited to the lower A pillar outer panel, and is similarly applied to, for example, a front side member.

The front side member has a portion that is bent into an S shape at a bent portion that rises from the bottom of the floor to the dash panel and protrudes toward the front. A portion of the front side member joined to the floor and the dash panel has a flange, and the bent portion protruding toward the front does not have a flange.

(1-1) Hot Stamping Formed Article The hot-stamping formed article according to the present embodiment is a hot-stamping formed article made of steel which has at least one of a tensile strength of 1200 MPa or more and a martensitic steel structure, and includes a first portion, a corner portion, and a second portion, which are sequentially continuous from one end portion to the other end portion in a longitudinal direction.

In this hot-stamping formed article, each of the first portion, the corner portion, and the second portion includes a top sheet and two vertical walls connected to the top sheet when viewed in a cross section perpendicular to the longitudinal direction, and the second portion includes a first outwardly-extending flange adjacent to the vertical wall.

The corner portion includes a vertical flange extending from the vertical wall of the first portion, a second outwardly-extending flange adjacent to the vertical wall located on the outer peripheral side of the corner portion out of the two vertical walls, and a transition portion in which the vertical flange and the second outwardly-extending flange are continuous.

Figure 1:
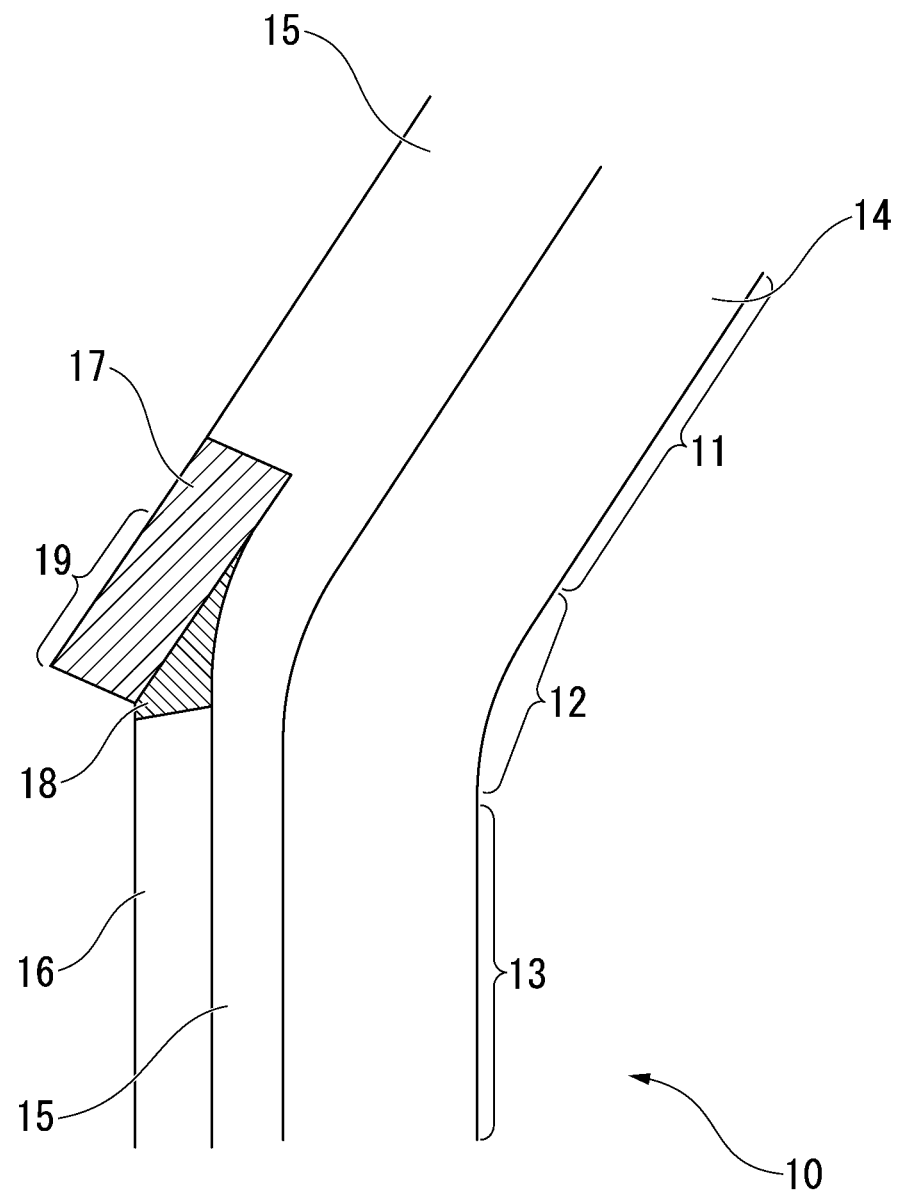
FIG. 1 is a schematic perspective view showing a configuration in the vicinity of a corner portion of a lower A pillar outer panel which is a hot-stamping formed article according to an embodiment of the present invention.

FIG. 1 is a schematic view showing a configuration in the vicinity of a corner portion of a lower A pillar outer panel 10 which is the hot-stamping formed article according to the present invention.

As shown in FIG. 1, the lower A pillar outer panel 10 includes a first portion 11, a corner portion 12, and a second portion 13 in order from one end portion (not shown) to the other end portion (not shown) in the longitudinal direction.

The first portion 11, the corner portion 12, and the second portion 13 each have a shape including a top sheet 14 and two vertical walls 15 connected to the top sheet 14 when viewed in a cross section perpendicular to the longitudinal direction.

The second portion 13 includes a first outwardly-extending flange 16 adjacent to the vertical wall 15.

The corner portion 12 bends in a direction intersecting the two vertical walls 15. That is, the corner portion 12 bends in the direction in which the second portion 13 is present in a plan view as viewed in a direction perpendicular to the sheet surface of the top sheet 14.

As shown in FIG. 1, the corner portion 12 may be defined as a portion including a point where the ridge line formed by the top sheet 14 and the vertical wall 15 located on the outer peripheral side of the corner portion becomes a curve.

Figure 3:
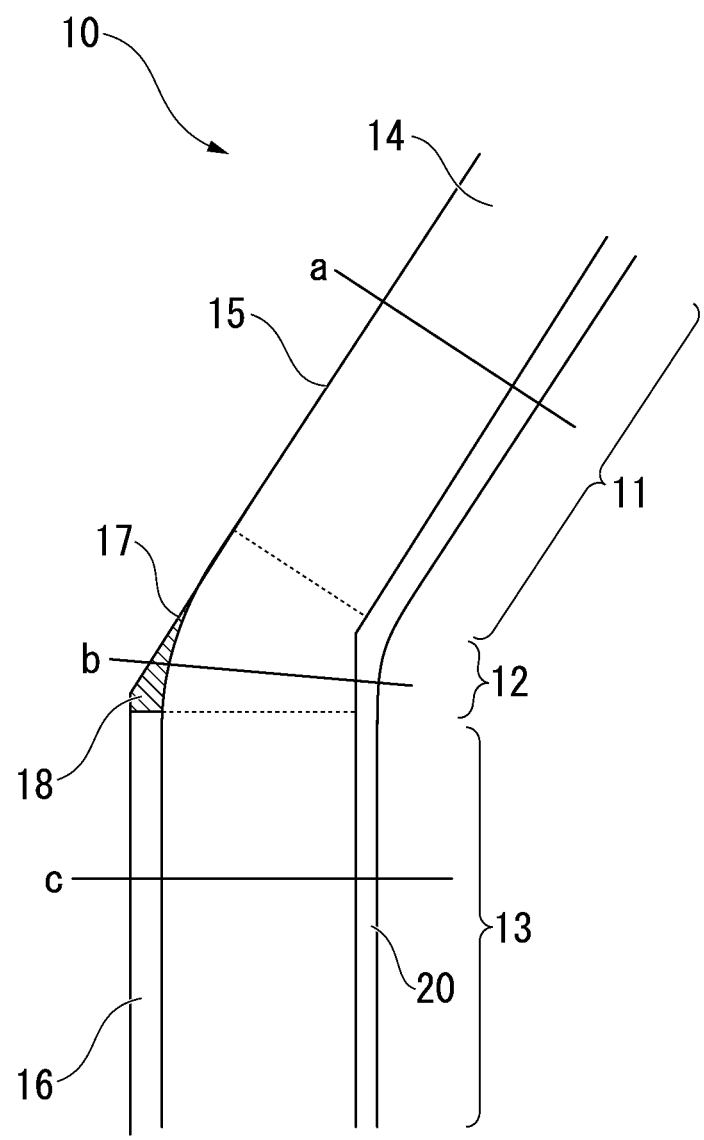
FIG. 3 is a schematic view of the vicinity of the corner portion of the lower A pillar outer panel when viewed in a plan view in a direction perpendicular to the sheet surface of a top sheet of the lower A pillar outer panel.

For example, as shown in FIG. 3, the corner portion 12 may be a portion which includes a point where the ridge line formed by the top sheet 14 and the vertical wall 15 becomes a curve when the lower A pillar outer panel 10 is viewed in a plan view in the direction perpendicular to the sheet surface of the top sheet 14 and is surrounded by line segments (dotted lines in FIG. 3) perpendicular to the ridge line formed by the top sheet 14 and the vertical wall 15.

The corner portion 12 includes a vertical flange 17 extending from the vertical wall 15 of the first portion 11 and a second outwardly-extending flange 18 adjacent to the vertical wall 15 located on the outer peripheral side of the corner portion 12 out of the two vertical walls 15. The vertical flange 17 is substantially parallel to the vertical wall 15 of the first portion 11 (the vertical wall 15 located on the outer peripheral side of the corner portion out of the two vertical walls 15), and may be configured to be connected to the vertical wall 15 of the first portion 11. The second outwardly-extending flange 18 is substantially parallel to the first outwardly-extending flange 16 of the second portion 13 and is configured to be connected to the first outwardly-extending flange 16 of the second portion 13.

The vertical wall 15 of the corner portion 12 (the vertical wall 15 located on the outer peripheral side of the corner portion out of the two vertical walls 15) has a curved surface, and is connected to the vertical wall 15 of the first portion 11 and the vertical wall 15 of the second portion 13.

The corner portion 12 includes a transition portion 19 in which the vertical flange 17 and the second outwardly-extending flange 18 are continuous. As will be described later, the transition portion 19 is configured to include, in its cross section, the vertical flange 17, the second outwardly-extending flange 18, and the vertical wall 15 of the corner portion (the vertical wall 15 located on the outer peripheral side of the corner portion out of the two vertical walls 15).

The hatched portions in FIG. 1 indicate the vertical flange 17 and the second outwardly-extending flange 18.

Figure 2:
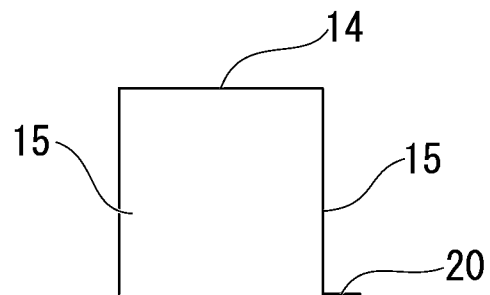
FIG. 2 is a schematic cross-sectional view showing a cross section perpendicular to a longitudinal direction in each portion of the lower A pillar outer panel which is the hot-stamping formed article according to the embodiment of the present invention. (a) of FIG. 2 is a cross-sectional view of a first portion, (b) of FIG. 2 is a cross-sectional view of a corner portion, and (c) of FIG. 2 is a cross-sectional view of a second portion.
Figure 2:
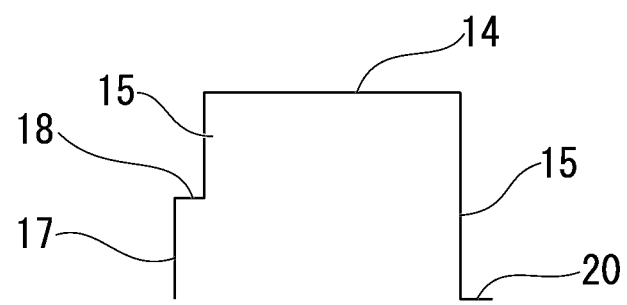
Figure 2:
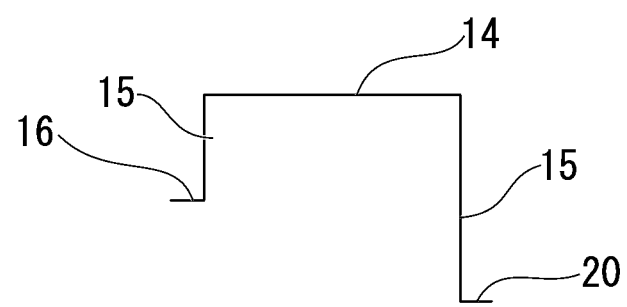

FIG. 2 is a cross-sectional view taken along cross sections a to c shown in FIG. 3. That is, (a) of FIG. 2, (b) of FIG. 2, and (c) of FIG. 2 are schematic sectional views of the first portion 11, the second portion 13, and the corner portion 12 when respectively viewed in cross sections perpendicular to the longitudinal direction.

As shown in (a) of FIG. 2, the first portion 11 includes the top sheet 14 and the two vertical walls 15 connected to the top sheet 14 when viewed in the cross section perpendicular to the longitudinal direction. The vertical wall 15 located on the inner peripheral side of the corner portion 12 includes a third outwardly-extending flange 20 adjacent to the vertical wall 15.

As shown in (c) of FIG. 2, the second portion 13 includes a top sheet 14 and two vertical walls 15 connected to the top sheet 14 when viewed in a cross section perpendicular to the longitudinal direction. The vertical wall 15 located on the outer peripheral side of the corner portion 12 includes the first outwardly-extending flange 16 adjacent to the vertical wall 15, and the vertical wall 15 positioned on the inner peripheral side of the corner portion 12 includes the third outwardly-extending flange 20 adjacent thereto the vertical wall 15.

As shown in (b) of FIG. 2, the transition portion 19 of the corner portion 12 includes the top sheet 14 and the two vertical walls 15 connected to the top sheet 14 when viewed in the cross section perpendicular to the longitudinal direction, and includes the vertical flange 17 extending from the vertical wall 15 of the first portion and the second outwardly-extending flange 18 adjacent to the vertical wall 15 located on the outer peripheral side of the corner portion 12 out of the two vertical walls 15, and the vertical flange 17 and the second outwardly-extending flange 18 are continuous.

The vertical wall 15 located on the inner peripheral side of the corner portion 12 includes the third outwardly-extending flange 20 adjacent to the vertical wall 15.

Here, the cross section perpendicular to the longitudinal direction in the corner portion 12 may be a cross section perpendicular to the longitudinal direction of either the first portion 11 or the second portion 13. Alternatively, the cross section perpendicular to the longitudinal direction in the corner portion 12 may be defined as a plane having the same angle with respect to the longitudinal direction of the first portion 11 and the longitudinal direction of the second portion 13.

The vertical flange 17 and the second outwardly-extending flange 18 of the corner portion 12 may have at least a point having a width of 5 mm or more, and preferably 15 mm or more.

Since the vertical flange 17 and the second outwardly-extending flange 18 have points having a width of 5 mm or more, the lower A pillar outer panel 10 and an inner member can be joined by laser welding. In addition, since the vertical flange 17 and the second outwardly-extending flange 18 have points having a width of 15 mm or more, joining can be performed by spot welding. By joining the lower A pillar outer panel 10 and the inner member to each other, rigidity is improved.

FIGS. 4 to 9 show modification examples of the corner portion 12. The hatched portions in FIGS. 4 to 9 indicate the vertical flange 17 and the second outwardly-extending flange 18.

Figure 4:
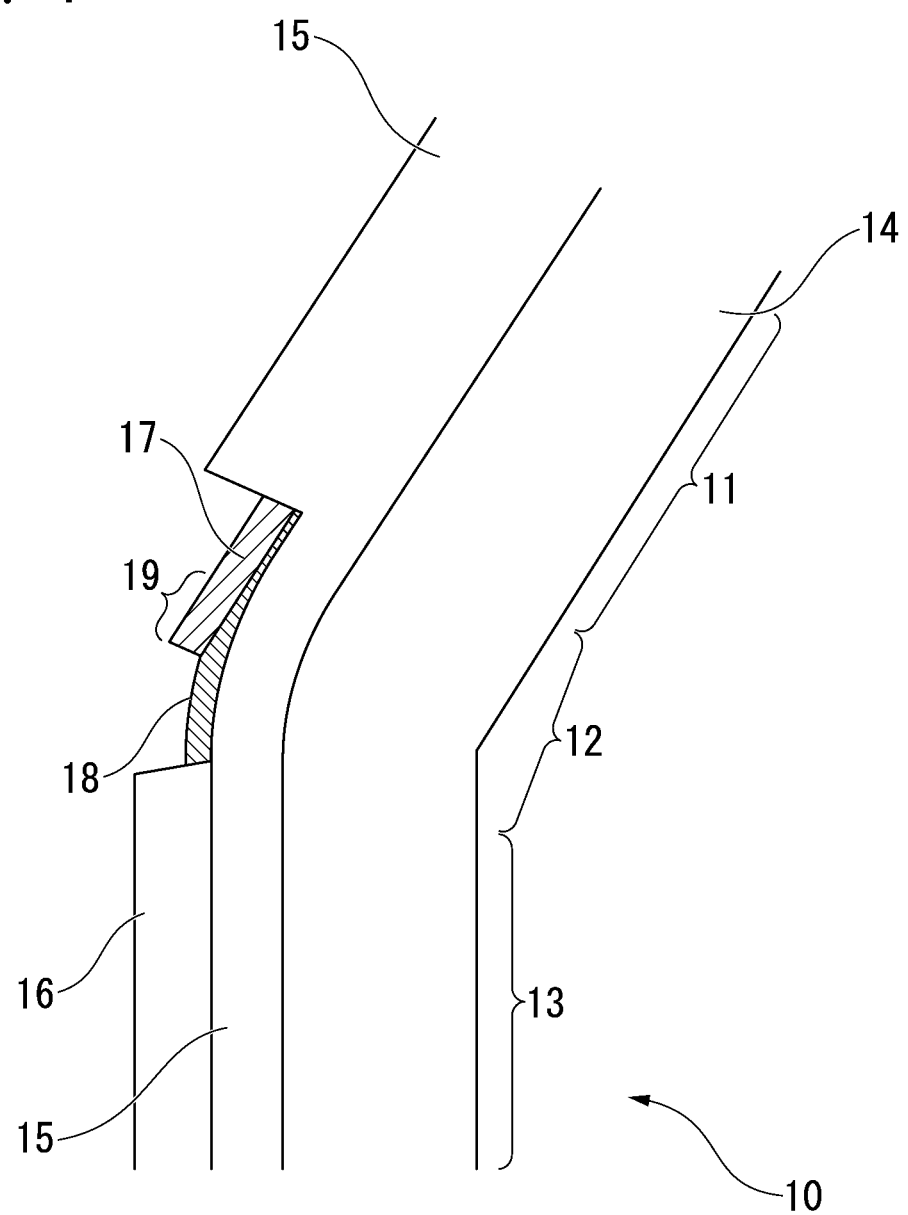
FIG. 4 is a schematic perspective view showing a corner portion of a lower A pillar outer panel which is a hot-stamping formed article according to a first embodiment.

In the modification example of FIG. 4, the width of the vertical flange 17 of the corner portion 12 is small, and the end portion of the vertical flange 17 and the end portion of the vertical wall 15 of the first portion 11 have a level difference. The width of the second outwardly-extending flange 18 is small, and the end portion of the second outwardly-extending flange 18 and the end portion of the first outwardly-extending flange of the second portion 13 have a level difference.

Figure 5:
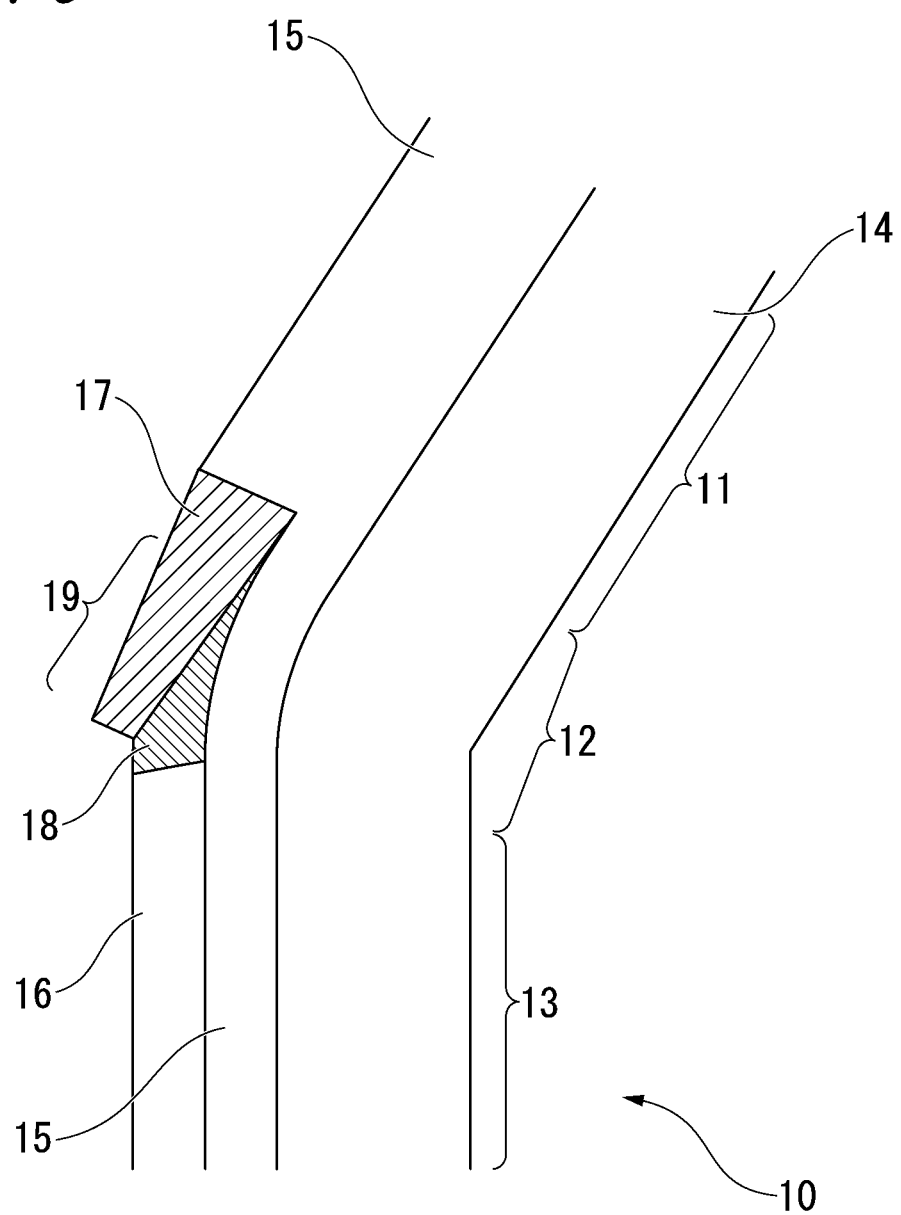
FIG. 5 is a schematic perspective view showing a modification example of the corner portion of the lower A pillar outer panel which is the hot-stamping formed article according to the first embodiment.

In the modification example of FIG. 5, the width of the vertical flange 17 of the corner portion 12 decreases as the distance from the first portion 11 increases.

This modification example also includes the transition portion 19 in which the vertical flange 17 and the second outwardly-extending flange 18 are continuous.

Figure 6:
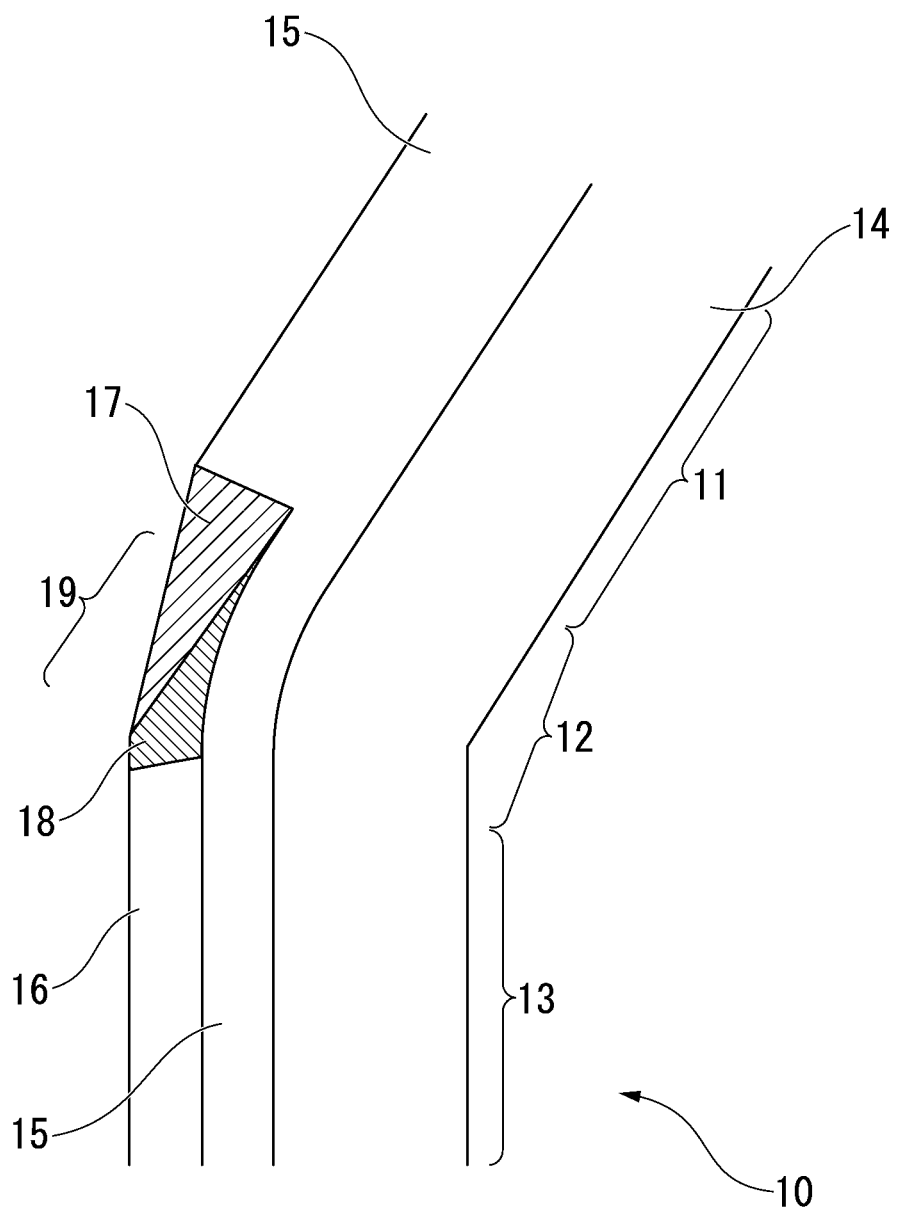
FIG. 6 is a schematic perspective view showing a modification example of the corner portion of the lower A pillar outer panel which is the hot-stamping formed article according to the first embodiment.

In the modification example of FIG. 6, the width of the vertical flange 17 of the corner portion 12 decreases as the distance from the first portion 11 increases. At the position farthest from the first portion 11, the width of the vertical flange 17 is 0, but includes the transition portion 19 in which the vertical flange 17 and the second outwardly-extending flange 18 are continuous.

Figure 7:
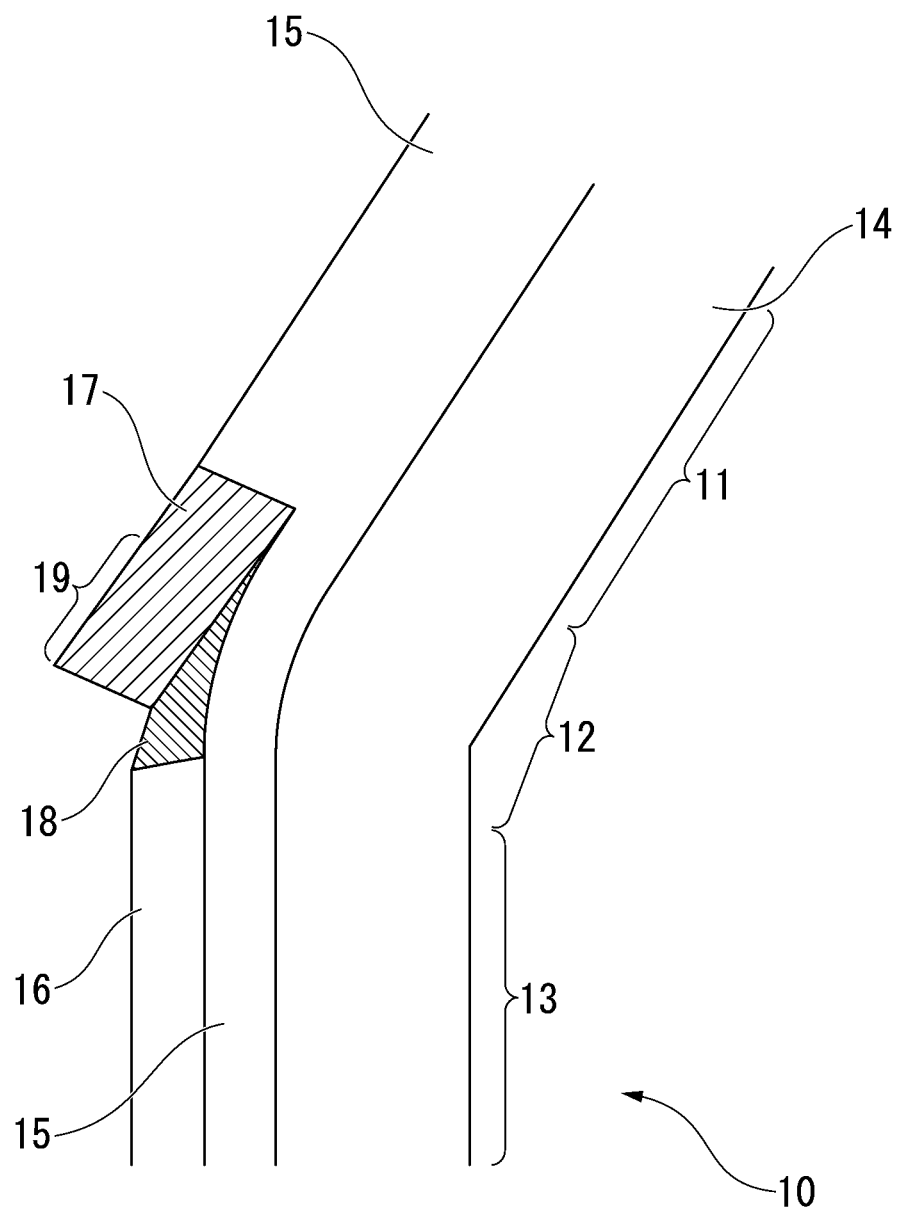
FIG. 7 is a schematic perspective view showing a modification example of the corner portion of the lower A pillar outer panel which is the hot-stamping formed article according to the first embodiment.

In the modification example of FIG. 7, the width of the second outwardly-extending flange 18 decreases as the distance from the second portion 13 increases.

This modification example also includes the transition portion 19 in which the vertical flange 17 and the second outwardly-extending flange 18 are continuous.

Figure 8:
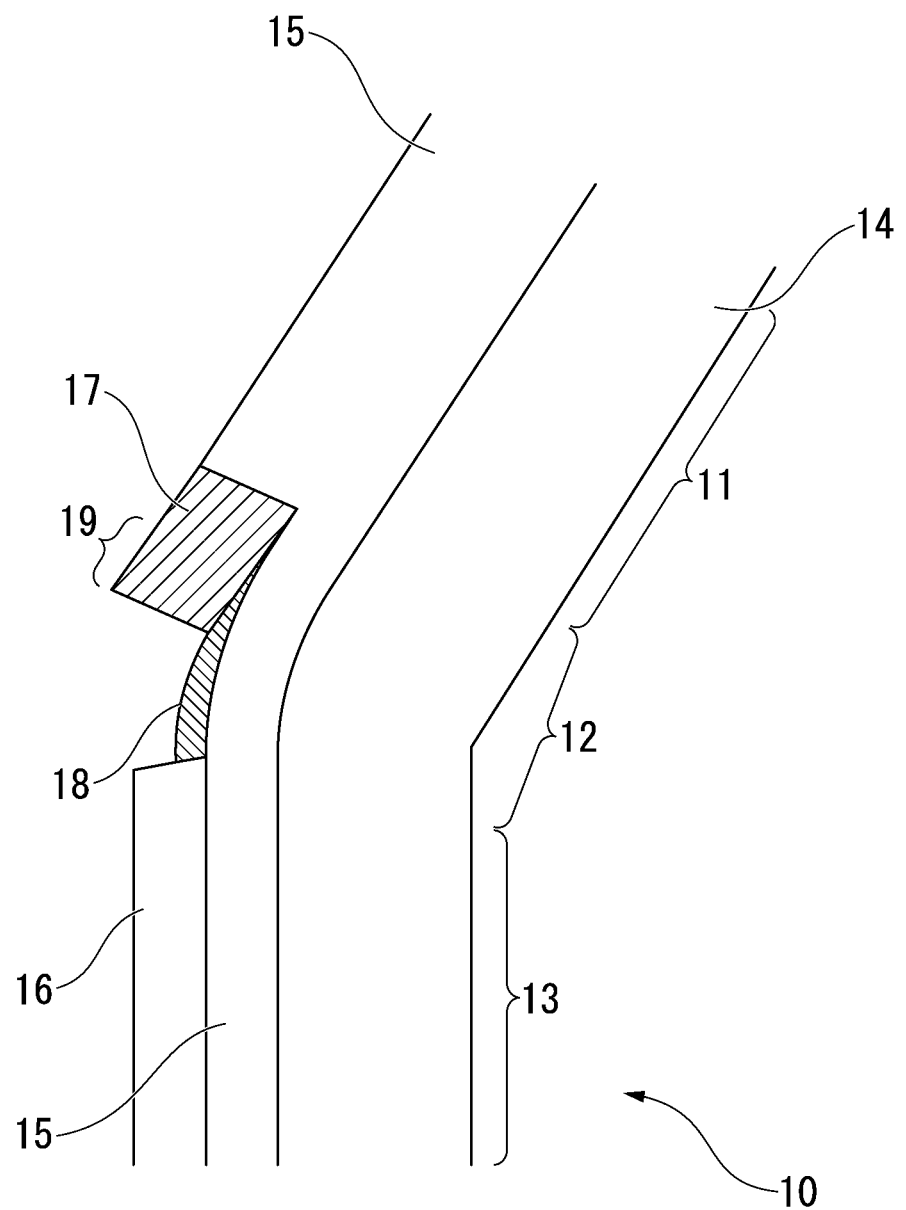
FIG. 8 is a schematic perspective view showing a modification example of the corner portion of the lower A pillar outer panel which is the hot-stamping formed article according to the first embodiment.

In the modification example of FIG. 8, the width of the second outwardly-extending flange 18 is small, and the end portion of the second outwardly-extending flange 18 and the end portion of the first outwardly-extending flange of the second portion 13 have a level difference.

This modification example also includes the transition portion 19 in which the vertical flange 17 and the second outwardly-extending flange 18 are continuous.

Figure 9:
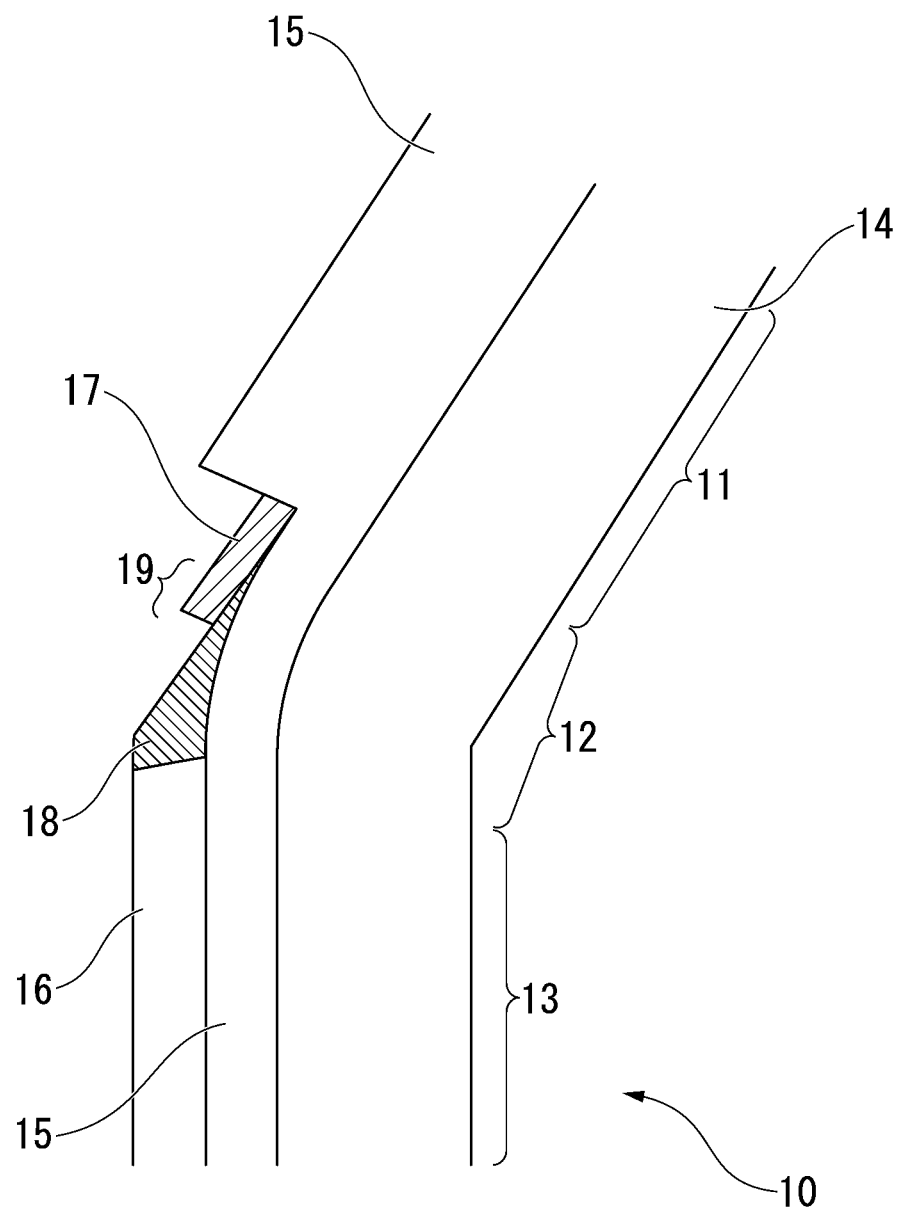
FIG. 9 is a schematic perspective view showing a modification example of the corner portion of the lower A pillar outer panel which is the hot-stamping formed article according to the first embodiment.

In the modification example of FIG. 9, the width of the vertical flange 17 of the corner portion 12 is small, and the end portion of the vertical flange 17 and the end portion of the vertical wall 15 of the first portion 11 have a level difference. Furthermore, at the end portion of the second outwardly-extending flange 18, there is a point where the vertical flange 17 is absent.

This modification example also includes the transition portion 19 in which the vertical flange 17 and the second outwardly-extending flange 18 are continuous.

In the lower A pillar outer panel 10 according to the present embodiment, the sheet thickness of the top sheet 14 which is a non-processed portion is 0.7 to 2.0 mm.

By causing the sheet thickness of the top sheet 14 to be this range, the lower A pillar outer panel 10 can be reduced in weight. In particular, since the lower A pillar outer panel 10 according to the present embodiment has the strength described later, a remarkable effect can be obtained in achieving a reduction in the weight while securing collision characteristics.

In the lower A pillar outer panel 10 according to the present embodiment, the sheet thickness of the vertical wall 15 in the first portion 11 is preferably 80% to 120% of the sheet thickness of the non-processed portion. That is, in the case where the sheet thickness of the non-processed portion is in the range of 0.7 to 2.0 mm, the sheet thickness of the vertical wall 15 in the first portion 11 is preferably 0.56 to 2.20 mm.

Furthermore, in the lower A pillar outer panel 10 according to the present embodiment, the sheet thickness of the vertical wall 15 in the first portion 11 is more preferably 90% to 110% of the sheet thickness of the non-processed portion.

In the lower A pillar outer panel 10 according to the present embodiment, the sheet thickness of the vertical wall 15 in the second portion 13 is preferably 80% to 120% of the sheet thickness of the non-processed portion. That is, in the case where the sheet thickness of the non-processed portion is in the range of 0.7 to 2.0 mm, the sheet thickness of the vertical wall 15 in the second portion 13 is preferably 0.56 to 2.20 mm.

Furthermore, in the lower A pillar outer panel 10 according to the present embodiment, the sheet thickness of the vertical wall 15 in the second portion 13 is more preferably 90% to 110% of the sheet thickness of the non-processed portion.

In the lower A pillar outer panel 10 according to the present embodiment, the sheet thickness of the first outwardly-extending flange 16 of the second portion 13 or the second outwardly-extending flange 18 of the corner portion 12 is preferably 80% to 120% of the plate thickness of the non-processed portion. That is, in the case where the sheet thickness of the non-processed portion is in the range of 0.7 to 2.0 mm, the thickness of the first outwardly-extending flange 16 or the second outwardly-extending flange 18 is 0.56 to 2.20 mm. It is preferable.

Further, in the lower A pillar outer panel 10 according to the present embodiment, the sheet thickness of the first outwardly-extending flange 16 or the second outwardly-extending flange 18 is 90% to 110% of the sheet thickness of the non-processed portion.

In the lower A pillar outer panel 10 according to the present embodiment, the width of the vertical wall 15 of the first portion 11 is preferably in a range of 40 to 100 mm in order to obtain a desired rigidity. In addition, it is preferable that the width of the vertical wall 15 of the second portion 13 is in a range of 40 to 100 mm and the width of the second outwardly-extending flange 18 of the second portion 13 is 5 to 30 mm.

In order to further improve the collision characteristics, it is more preferable that the width of the vertical wall 15 of the first portion 11 is in a range of 60 to 100 mm, and the width of the vertical wall 15 of the second portion 13 is in a range of 60 to 100 mm. Furthermore, it is more preferable that the width of the second outwardly-extending flange 18 of the second portion 13 is 15 to 20 mm so that spot welding can be performed without waste.

In the description of the above-described embodiment, it can be said that the corner portion 12 of the lower A pillar outer panel 10 includes a transition portion, in other words, a shape having no "cutout part" in the corner portion 12.

FIGS. 10 to 14 are examples of the lower A pillar outer panel 21 having a cutout 23 on the outer peripheral side of the corner portion 22. That is, this is a modification example of the lower A pillar outer panel in the related art that requires the cutout 23 in order to suppress the generation of wrinkles in the corner portion.

Figure 10:
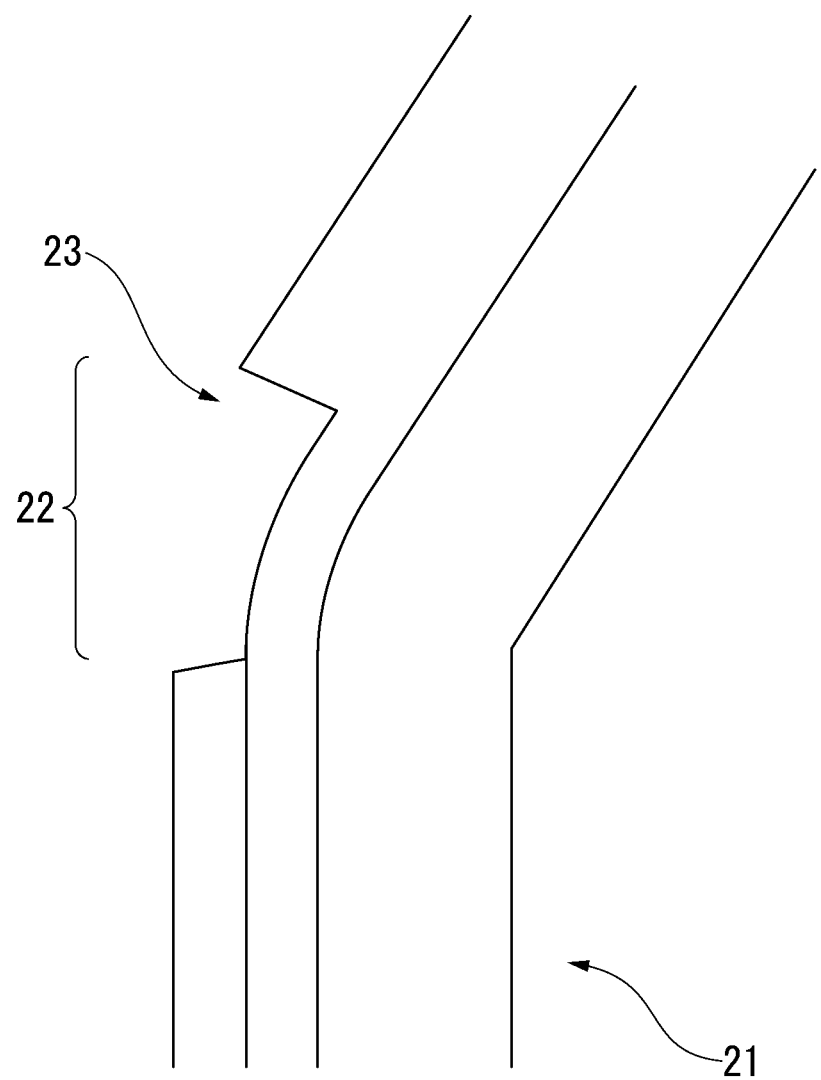
FIG. 10 is a schematic perspective view showing a modification example of a corner portion of a lower A pillar outer panel in the related art.
Figure 11:
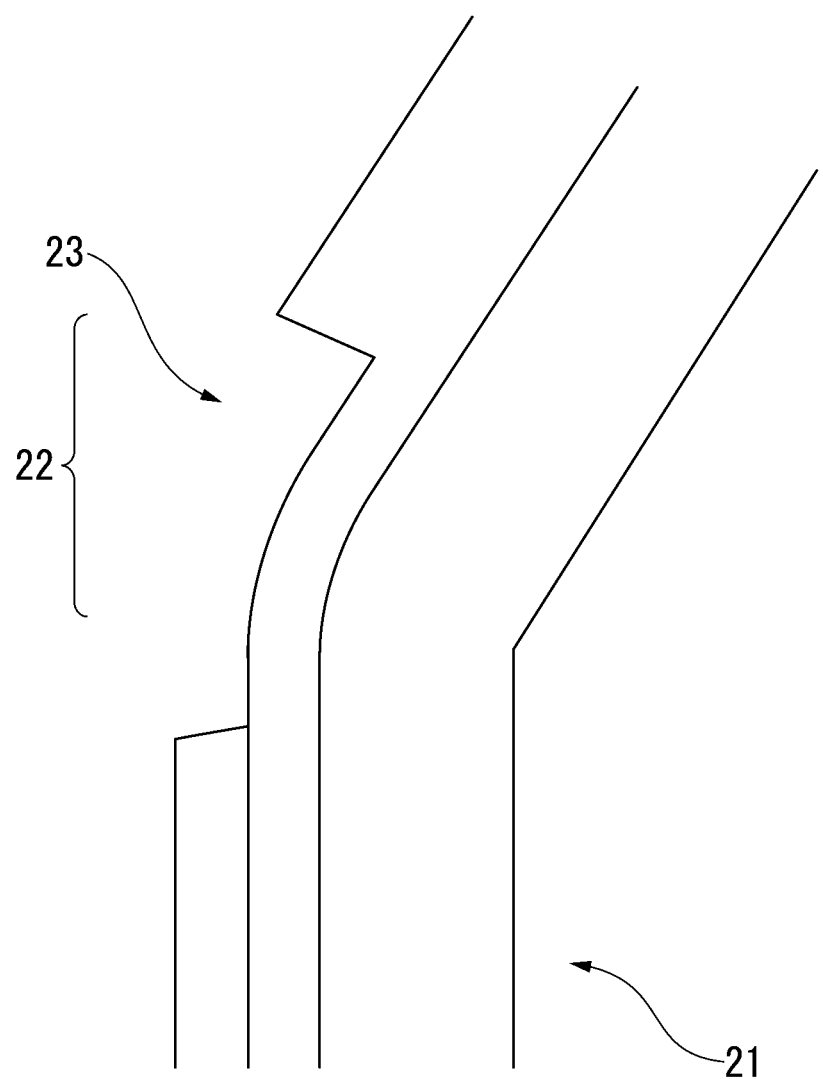
FIG. 11 is a schematic perspective view showing a modification example of the corner portion of the lower A pillar outer panel in the related art.
Figure 12:
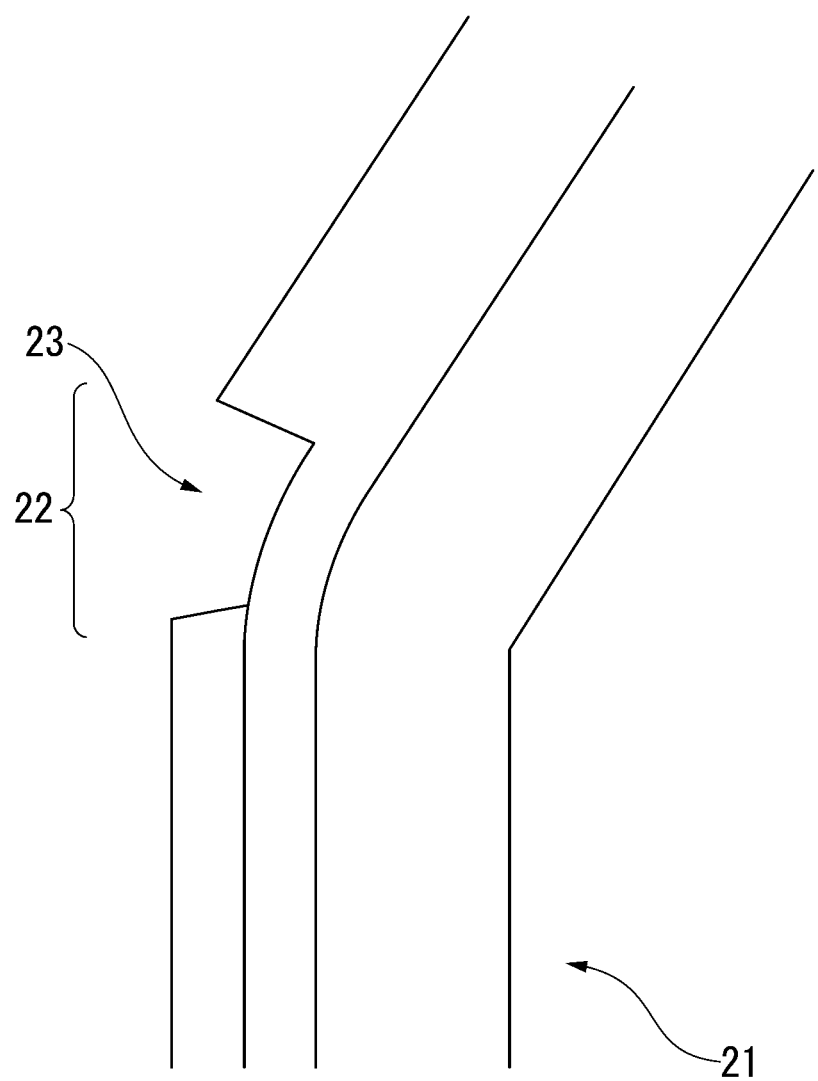
FIG. 12 is a schematic perspective view showing a modification example of the corner portion of the lower A pillar outer panel in the related art.
Figure 13:
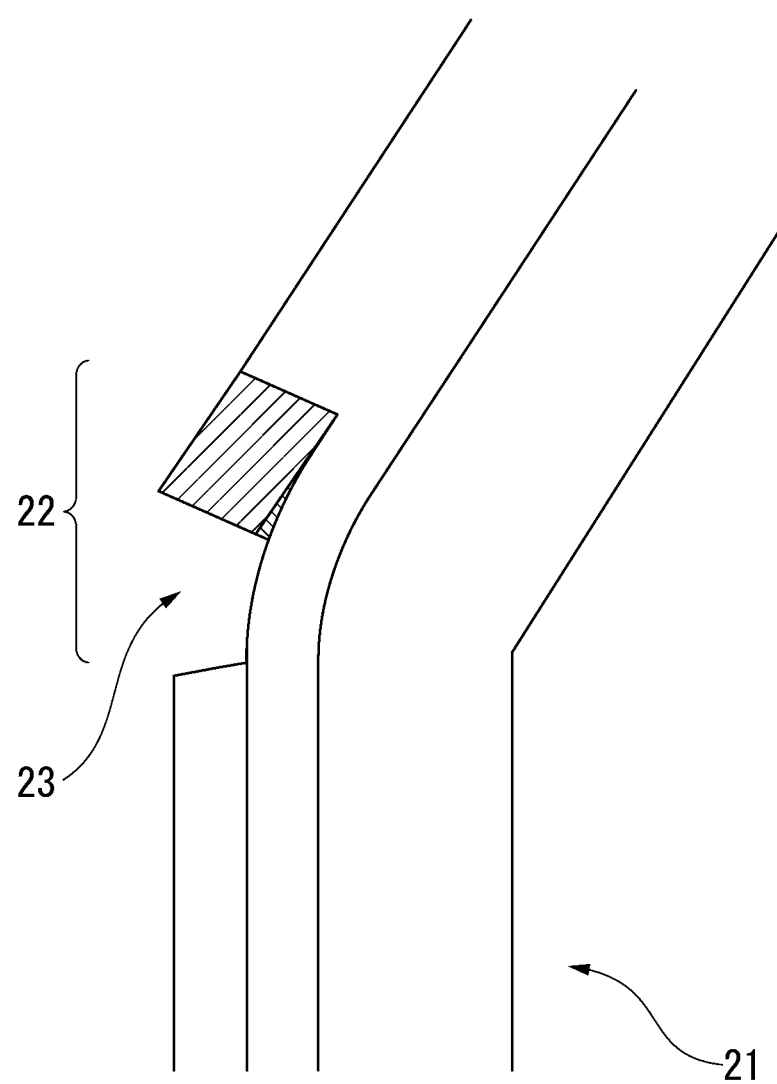
FIG. 13 is a schematic perspective view showing a modification example of the corner portion of the lower A pillar outer panel in the related art.
Figure 14:
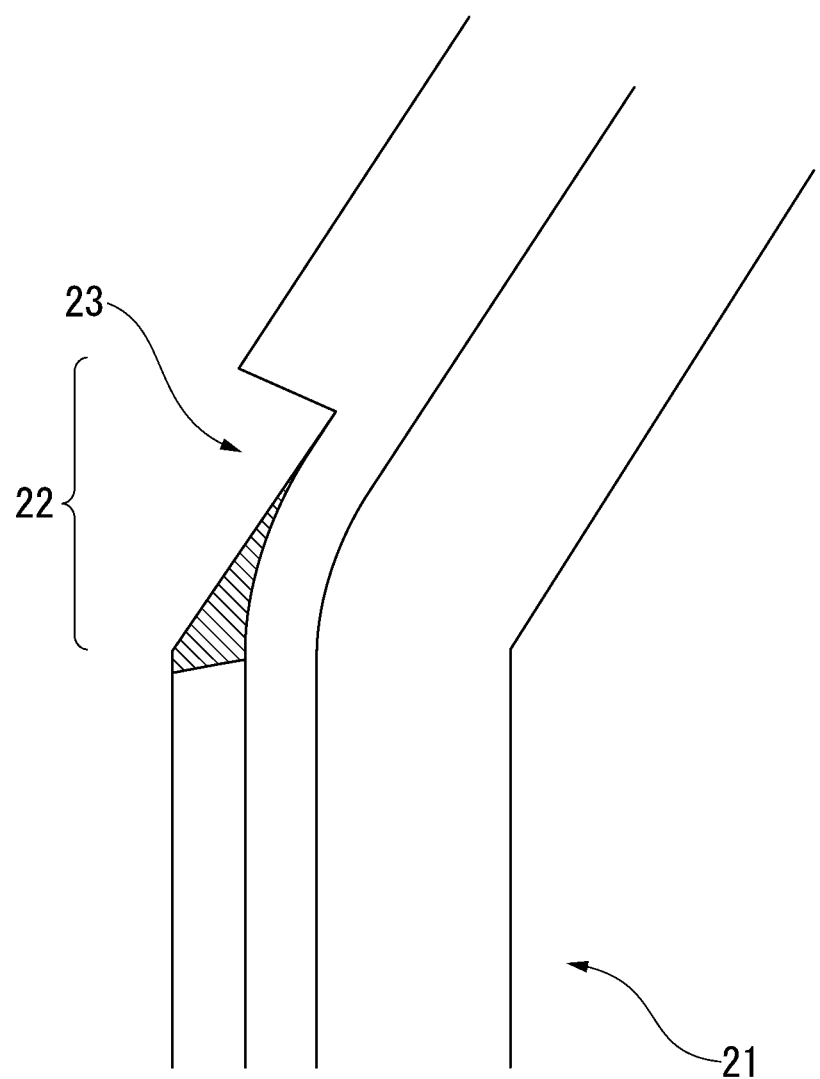
FIG. 14 is a schematic perspective view showing a modification example of the corner portion of the lower A pillar outer panel in the related art.

In the examples of FIGS. 10 and 11, the cutout part 23 is present over the entire periphery on the outer peripheral side of the corner portion 22. In the examples of FIGS. 12 to 14, a portion of the corner portion 22 has the cutout part 23.

Figure 15:
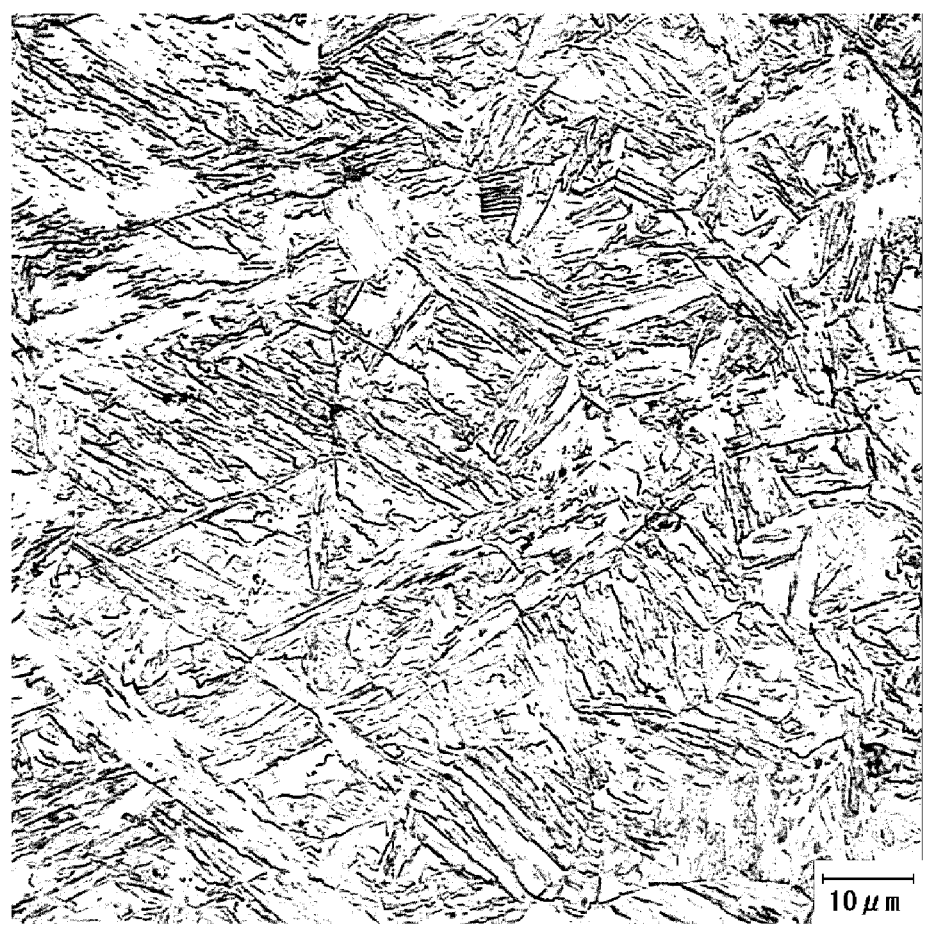
FIG. 15 is a photograph of the metallographic structure of a hot-stamping formed article obtained by hot stamping.

The lower A pillar outer panel 10 according to the present embodiment has at least one of a tensile strength of 1200 MPa or more and a martensitic steel structure. FIG. 15 is a photograph of the metallographic structure of a hot-stamping formed article obtained by hot stamping, and shows the martensitic steel structure.

As described above, since the lower A pillar outer panel 10 which is the hot-stamping formed article according to the present embodiment has at least one of a tensile strength of 1200 MPa or more and a martensitic steel structure and the corner portion 12 includes the transition portion 19 in which the vertical flange 17 and the second outwardly-extending flange 18 are continuous, bending rigidity and torsional rigidity are remarkably improved.

Furthermore, the lower A pillar outer panel 10 which is the hot-stamping formed article according to the present embodiment has a sheet thickness of 0.7 to 2.0 mm and is thus lightweight.

Figure 16:
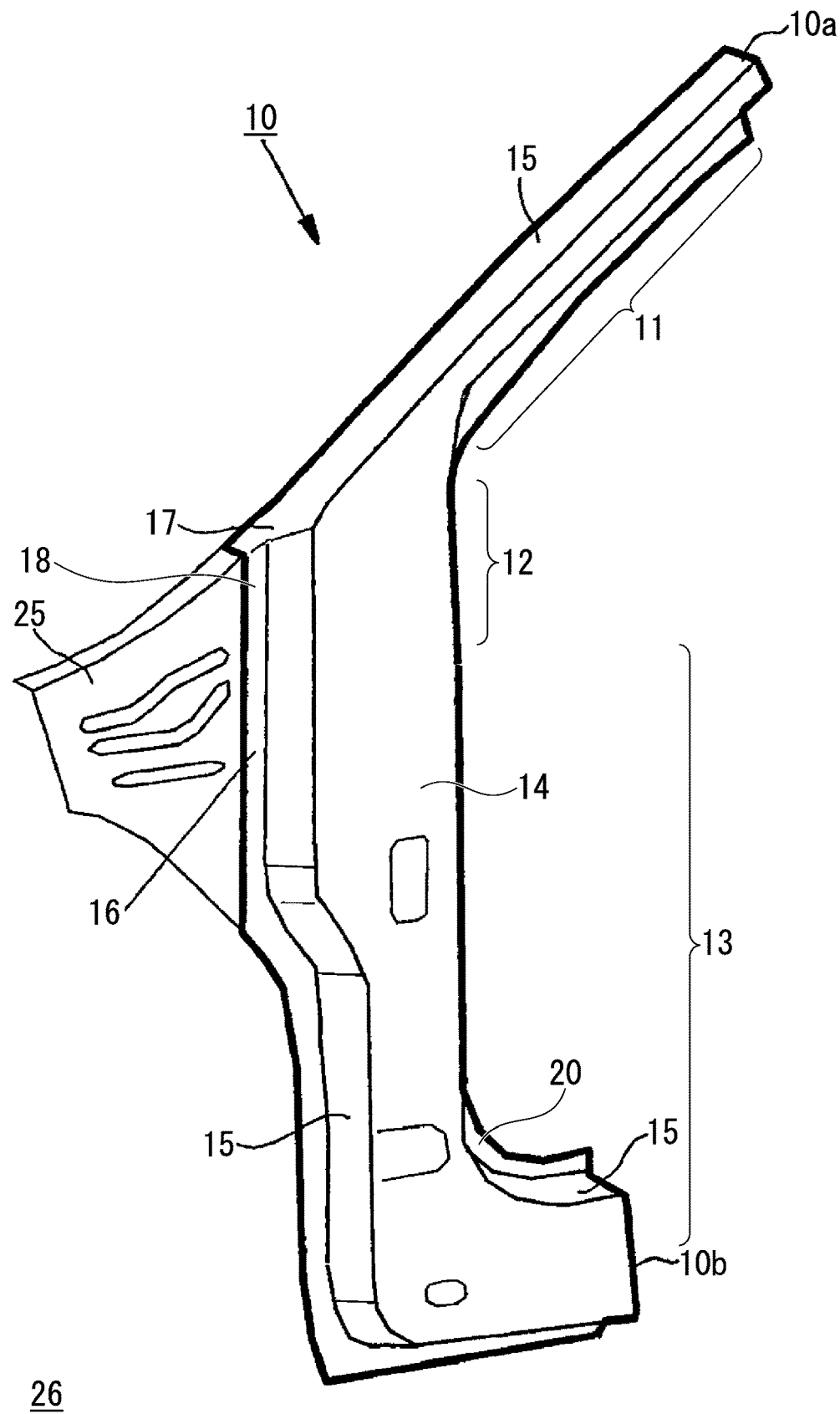
FIG. 16 is a schematic perspective view showing a structural member obtained by joining the lower A pillar outer panel according to the first embodiment to an inner member.

FIG. 16 is an example of a structural member 26 in which the lower A pillar outer panel 10 according to the present embodiment and the inner member 25 are joined to each other. As shown in FIG. 16, the lower A pillar outer panel 10 includes the first portion 11, the corner portion 12, and the second portion 13 in order from one end portion 10a to the other end portion 10b in the longitudinal direction. The inner member 25 is joined to the lower A pillar outer panel 10 at the vertical flange 17 and the second outwardly-extending flange 18.

A bodyshell in which the lower A pillar outer panel 10 according to the present embodiment is assembled can be increased in the rigidity in an engine compartment (particularly the vicinity of left and right front side member attachment portions) via a dash panel joined to the lower A pillar outer panel 10 while suppressing an increase in weight, whereby the amount of deflection of the front side member during, for example, pylon slalom traveling can be reduced, and the steering stability of the vehicle can be increased.

(1-2) Manufacturing Device Next, a device for manufacturing the hot-stamping formed article according to the present invention will be described.

Figure 17:
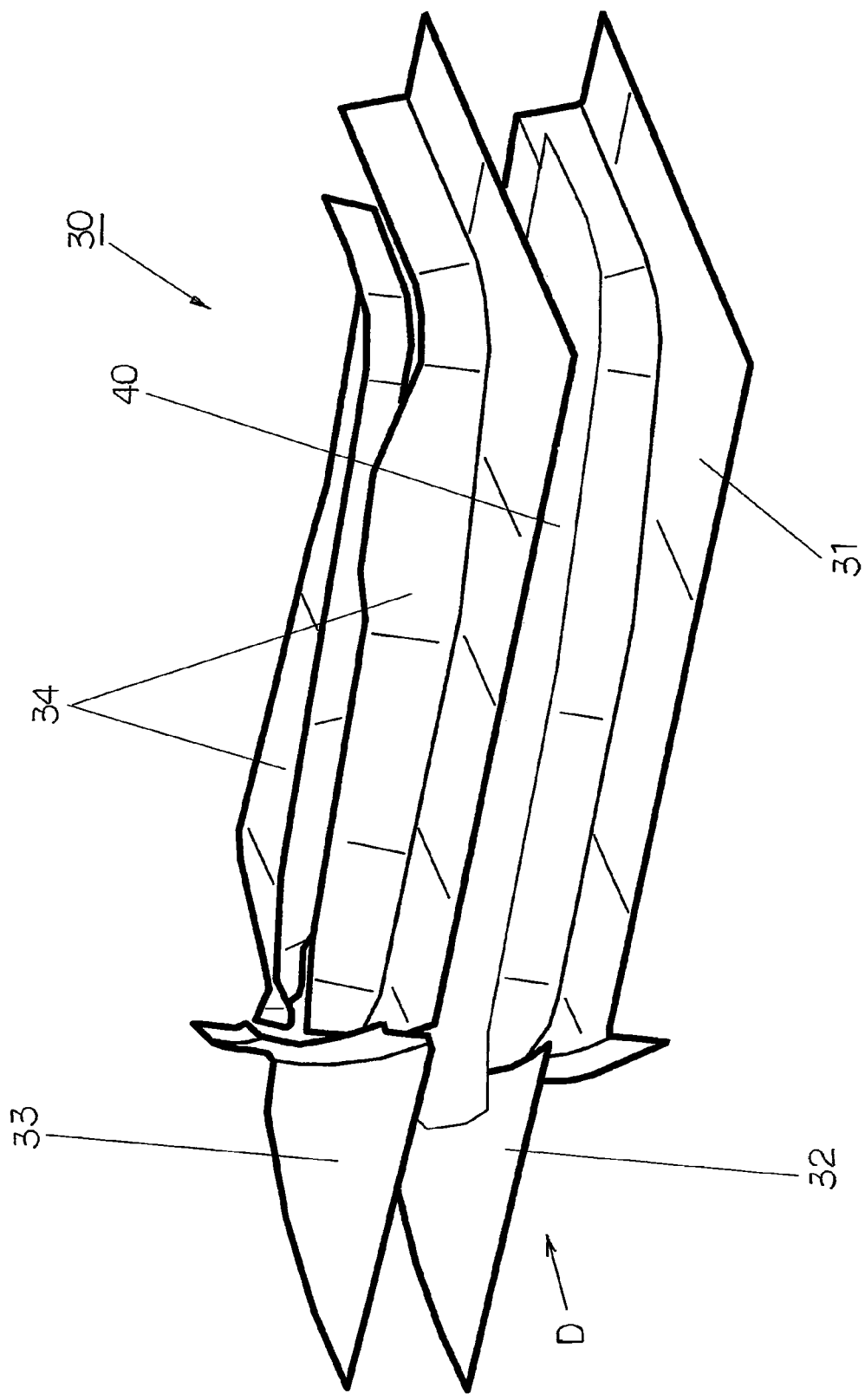
FIG. 17 is a schematic perspective view showing a device for manufacturing the hot-stamping formed article according to the embodiment of the present invention.

FIG. 17 is a schematic perspective view showing a manufacturing device 30 according to the present invention. In FIG. 17 and FIGS. 20, 25, and 27, which will be described later, for ease of viewing of the drawings, work surfaces of respective tools are extracted and shown.

The manufacturing device 30 is a device that manufactures the lower A pillar outer panel 10 by performing press forming on a blank 40 in one step by a hot stamping method. The manufacturing device 30 includes a punch 31, a blank holder 32, a pad (not shown) disposed to face the punch 31, a die 33 disposed to face the blank holder 32, and a bending die 34.

The pad does not necessarily need to be used, and may be used as needed. However, in a case where the pad is not used, the blank 40 may be displaced in an unintended direction during forming and cracks and wrinkles may be generated, which demands attention.

The die 33 and the bending die 34, and the punch 31 are disposed so as to move relatively close to and away from each other.

The punch 31 and the pad can press a portion of the blank 40 to be formed into the top sheet 14.

The blank holder 32 and the die 33 can sandwich a portion of the blank 40 which is to be formed into the vertical wall 15 located on the outer peripheral side of the corner portion 12 out of the two vertical walls 15 present in the first portion 11 and the corner portion 12.

The punch 31, the blank holder 32, and the die 33 can draw at least a part of the portion which is to be formed into the vertical wall 15 located on the outer peripheral side of the corner portion 12 out of the two vertical walls 15 present in the first portion 11 and the corner portion 12, and the punch 31 and the bending die 34 can perform bending forming on the remaining part excluding this part.

The blank holder 32 and the die 33 finish sandwiching the portion which is to be formed into the vertical wall 15 located on the outer peripheral side of the corner portion 12 out of the two vertical walls 15 present in the first portion 11 and the corner portion 12, by drawing-out before the bottom dead center is reached.

The pad or the blank holder 32 has a locking mechanism. The locking mechanism is for preventing a press-formed article from being damaged by pressurization of the blank holder 32 or the pad together with the die 33 and the bending die 34 against the press-formed article which is formed when the die is raised after the bottom dead center, and is a mechanism for mechanically or electrically controlling (locking) the rising of the blank holder 32 when the die rises after the bottom dead center.

This locking mechanism is necessary in a case where the pad is used and a flange of the drawn portion is in a state of being sandwiched between the blank holder 32 and the die 33 at the bottom dead center.

(1-3) Manufacturing Method

Next, a method for manufacturing the hot-stamping formed article according to the present invention will be described.

In the following description, the case where a pad 35 is used will be described as an example.

Figure 18:
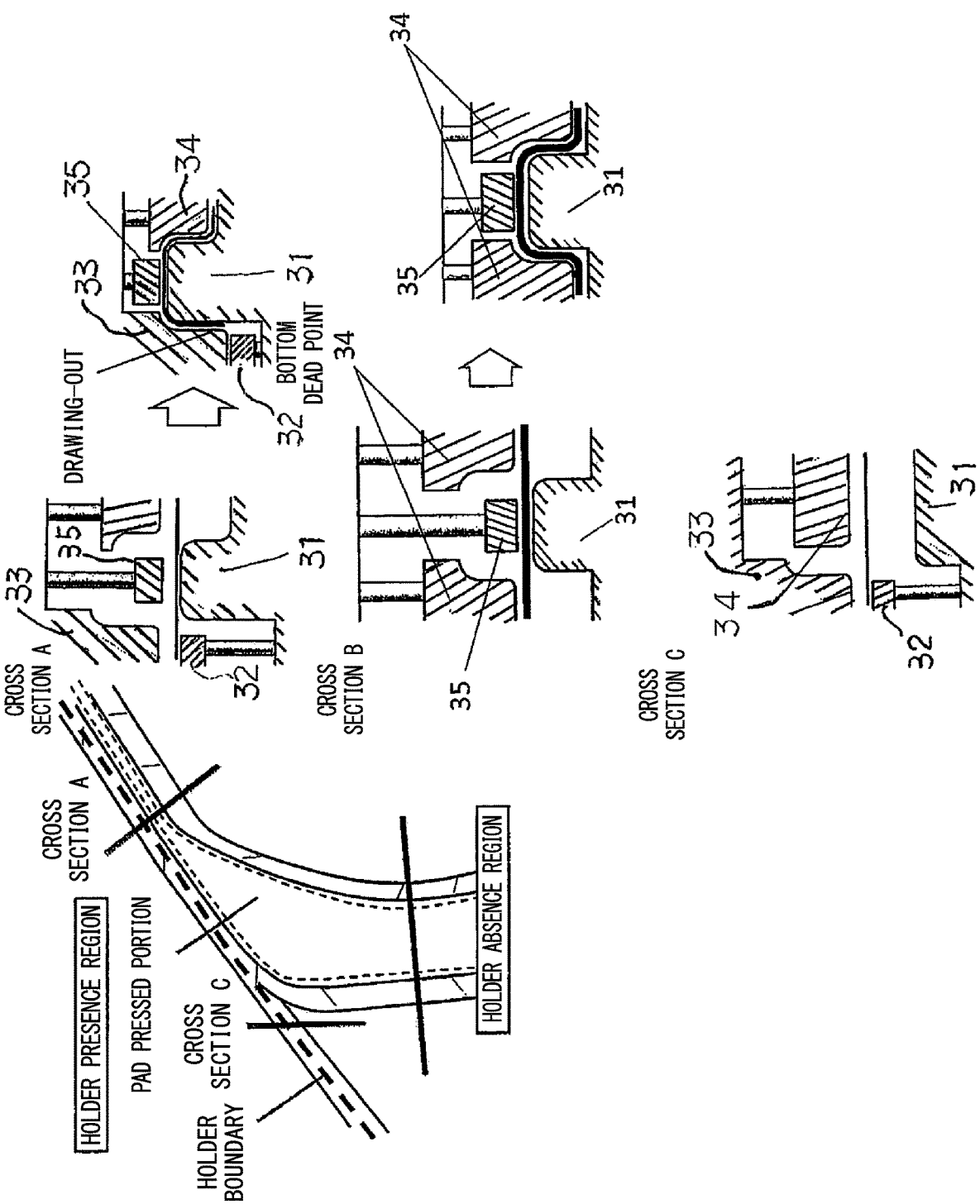
FIG. 18 is a schematic view showing a situation in which the lower A pillar outer panel according to the first embodiment is manufactured by performing a one-step bending drawing combined forming in which bending forming and drawing are combined, using a hot stamping method.

FIG. 18 is a view showing a situation in which the lower A pillar outer panel 10 according to the present embodiment is manufactured by performing a one-step bending drawing combined forming in which bending forming and drawing are combined, using the hot stamping method.

Figure 19:
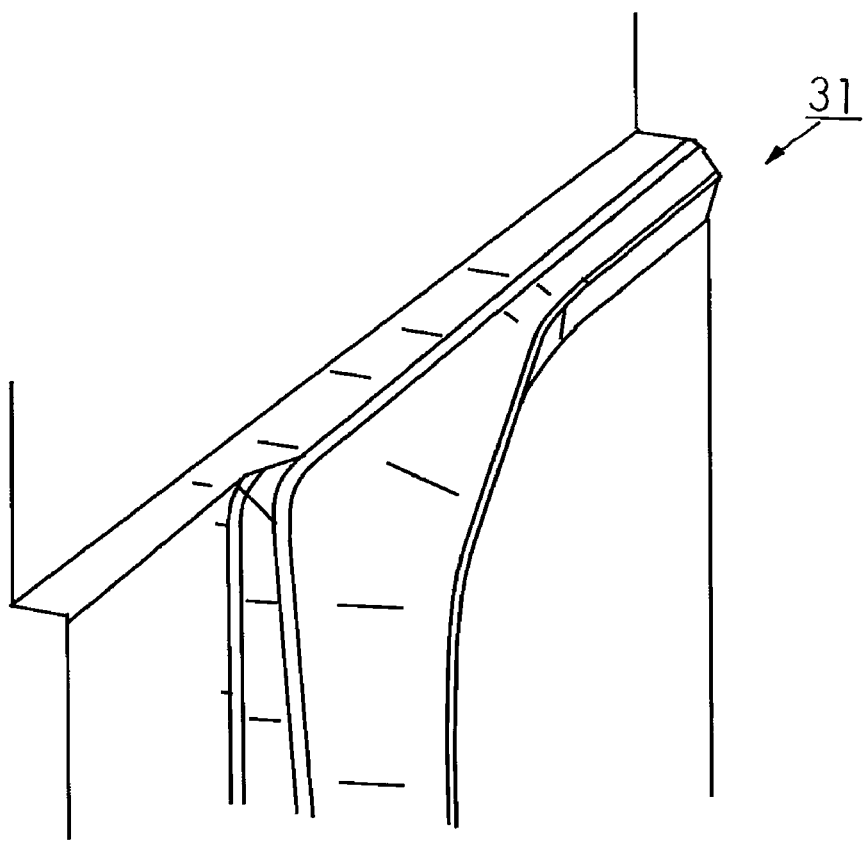
FIG. 19 is a schematic perspective view showing the exterior shape of a punch used in the hot stamping method.

FIG. 19 is an explanatory view showing the exterior shape of the punch 31 used in the manufacturing method according to the present embodiment.

In the manufacturing method according to the present embodiment, the lower A pillar outer panel 10 is manufactured by performing press forming on the blank 40 by the hot stamping method.

As shown in FIG. 18, the blank 40 is disposed between the punch 31 and the blank holder 32, the pad 35 disposed to face the punch 31, the die 33 disposed to face the blank holder 32, and the bending die 34.

Next, the portion of the blank 40 which is to be formed into the top sheet 14 ("pad pressed portion" in FIG. 18) is pressed by the punch 31 and the pad 35.

Next, as shown in FIG. 18, the portion of the blank 40 which is to be formed into the vertical wall 15 located on the outer peripheral side of the corner portion 12 (a portion described as "holder presence region" in FIG. 18) is sandwiched between the blank holder 32 and the die 33. This portion is a portion to be formed into the vertical wall 15 of the first portion 11 of the lower A pillar outer panel 10 (the vertical wall 15 located on the outer peripheral side of the corner portion 12).

In FIG. 18, "holder boundary" indicates the position of the end portion of the blank holder 32.

In addition, by moving the die 33 and the bending die 34 relatively close to the punch 31, at least a part of the portion which is to be formed into the vertical wall 15 located on the outer peripheral side of the corner portion 12 out of the two vertical walls 15 present in the first portion 11 and the corner portion 12 is drawn by the punch 31, the blank holder 32, and the die 33. Simultaneously, the remaining part (the shaded portion described as "holder absence region" in FIG. 18) excluding the part to be drawn is subjected to bending forming by the punch 31 and the bending die 34.

Here, as shown in a cross section C in FIG. 18, it is desirable for the die 33 and the bending die 34 to start simultaneously coming into contact with the blank 40 and start forming because the movement of an excessive material during the forming can be suppressed and the generation of wrinkles can be reduced.

Immediately before the finish of the forming, the portion of the blank 40 which is to be formed into the vertical wall 15 located on the outer peripheral side of the corner portion 12 is drawn out before reaching the bottom dead center, and sandwiching thereof between the blank holder 32 and the die 33 is finished.

That is, the vertical wall 15 of the first portion 11 having no flange is formed by drawing. When the vertical wall of the first portion is subjected to drawing, the vertical wall 15 having no flange can be formed by so-called "drawing-out". In the drawing-out, a blank is sandwiched between a die and a die holder during forming, and the blank is in a state of being not sandwiched between the die and the die holder at the time of completion of the forming.

In order to reliably perform the drawing-out, the drawing depth of the vertical wall 15 of the first portion 11 is preferably the height of the vertical wall 15+(10 to 20 mm), and more preferably the height of the vertical wall 15+(10 to 30 mm). Here, the drawing depth is the distance that the die 33 moves after holding the blank. Furthermore, the movement amount of the blank holder 32 may be the height of the vertical wall 15+(10 to 20 mm).

By forming the vertical wall 15 of the first portion 11 by the drawing-out, the lower A pillar outer panel 10 of the present embodiment can be formed by a one-step hot stamping method without the locking mechanism.

As described above, the lower A pillar outer panel 10 is formed in one step by the manufacturing method according to the present embodiment.

Figure 37:
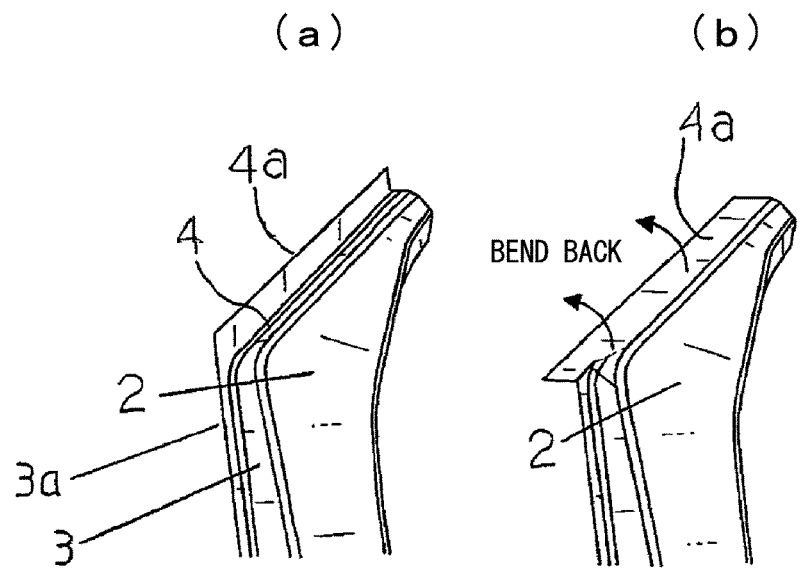
FIG. 37 is an explanatory view showing a two-step cold forming method of a lower A pillar outer panel in the related art.
Figure 38:
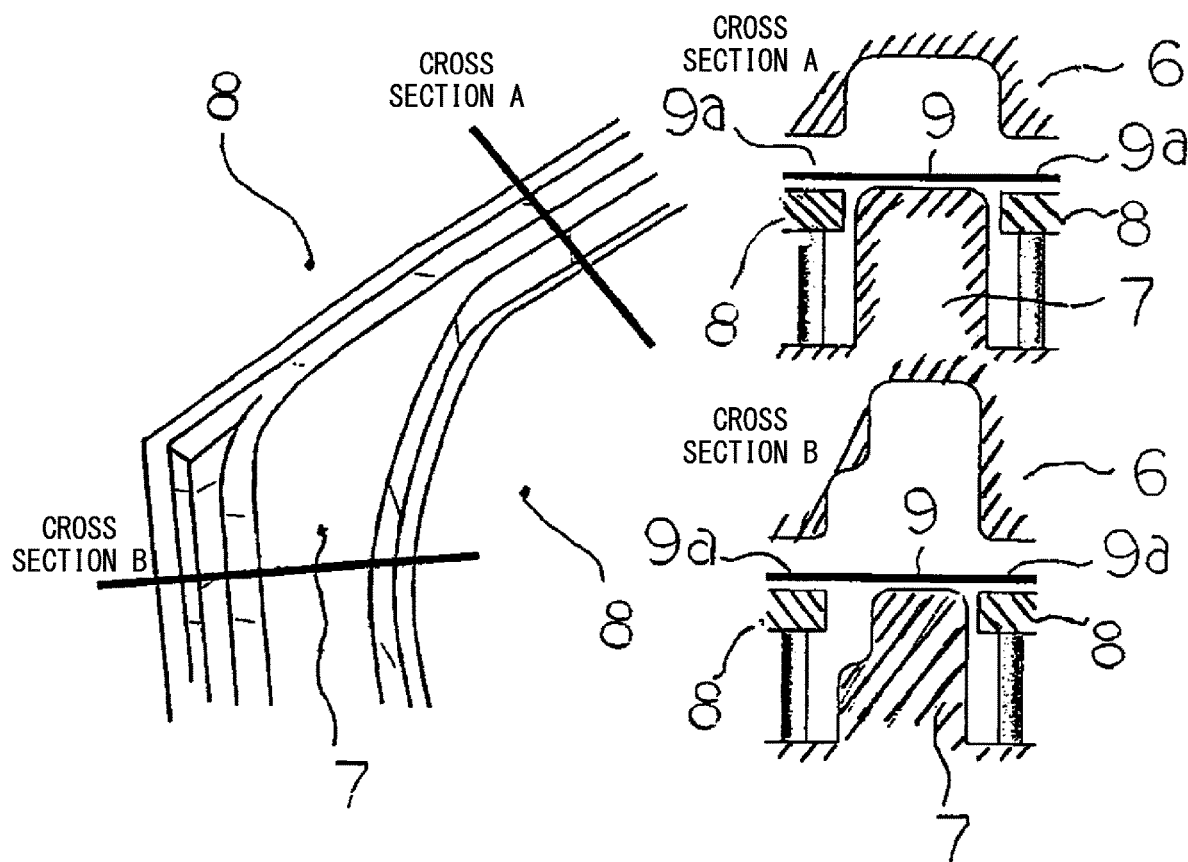
FIG. 38 is an explanatory view showing a situation in which a lower A pillar outer panel having vertical walls in a corner portion is drawn in one step by a cold forming or hot stamping method.

For example, in a case where forming is performed in two steps as shown in FIG. 37, particularly in a case where a blank having a strength of 980 MPa or more is used, a bent-back portion may be formed. In the lower A pillar outer panel, since the vertical wall (glass surface flange) of the first portion with no outwardly-extending flange serves as a mounting surface for the windshield, the presence of such a bent-back portion is not preferable. In particular, in a case where the vertical wall has a curved shape rather than a straight shape, the bent-back portion tends to be formed.

In the hot-stamping formed article according to the present embodiment, the vertical wall of the first portion is formed by a one-step hot stamping method. Therefore, such a bent back portion may be generated in the glass surface flange of the lower A pillar outer panel. Absent.

Figure 20:
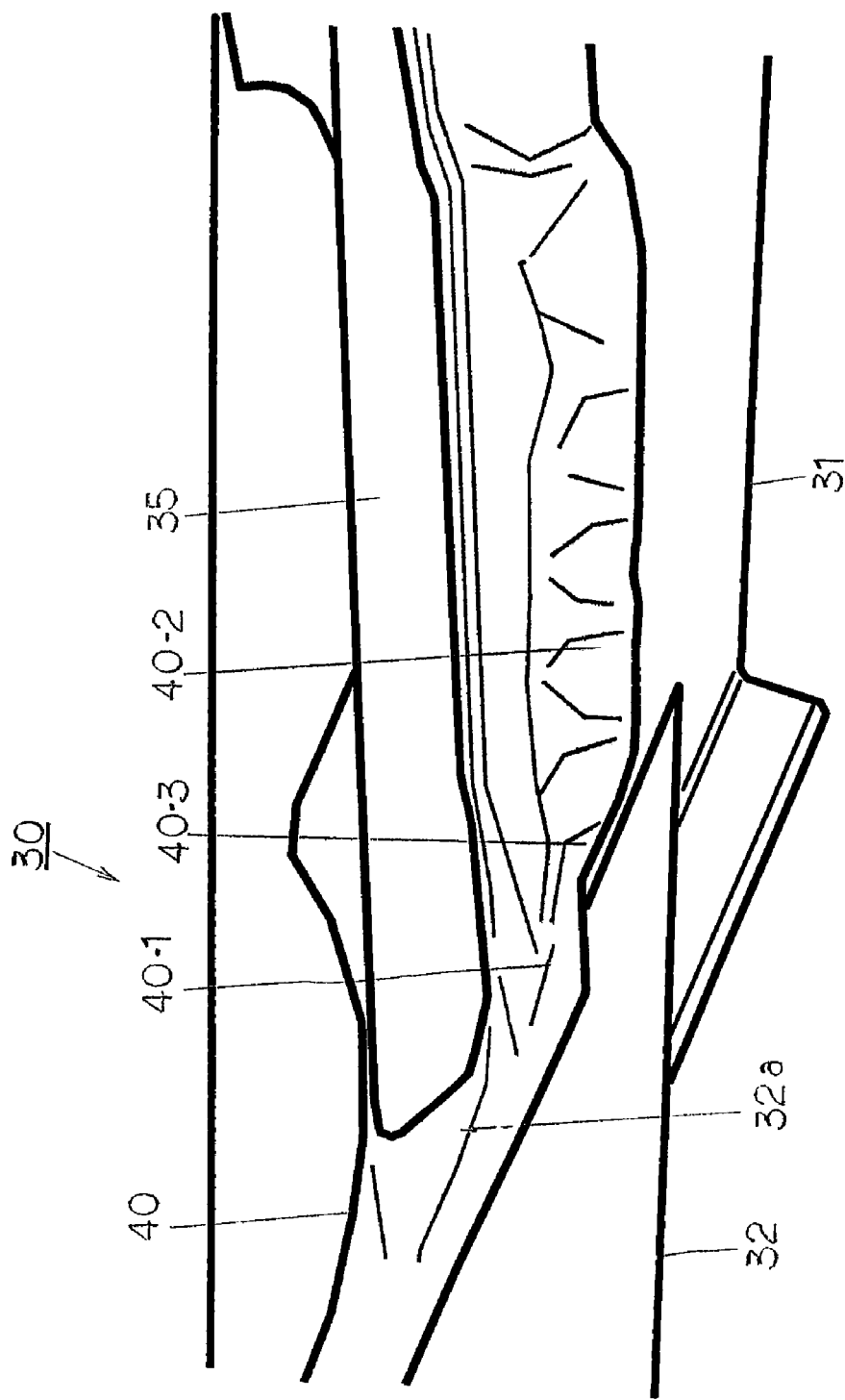
FIG. 20 is a schematic perspective view showing a deformed state of a blank during forming by the manufacturing device of the first embodiment.

FIG. 20 is an enlarged perspective view showing a deformed state of the blank during the forming by the manufacturing device 30 of the first embodiment, and is a view seen in the D direction in FIG. 17. In FIG. 20, the die 33 and the bending die 34 are omitted for ease of viewing of the drawing. In addition, in FIG. 20, the pad 35 is shown on the blank 40.

Next, the movement of the die 33 and the blank holder 32 and the deformation behavior of the blank 40 in the manufacturing method according to the present embodiment will be described.

FIGS. 21 to 24 are schematic cross-sectional views showing the movement of the die 33 and the blank holder 32, and the deformation behavior of the blank 40 in each of the cross sections of portions which are to become the first portion 11, the corner portion 12, and the second portion 13 of the lower A pillar outer panel 10.

Figure 21:
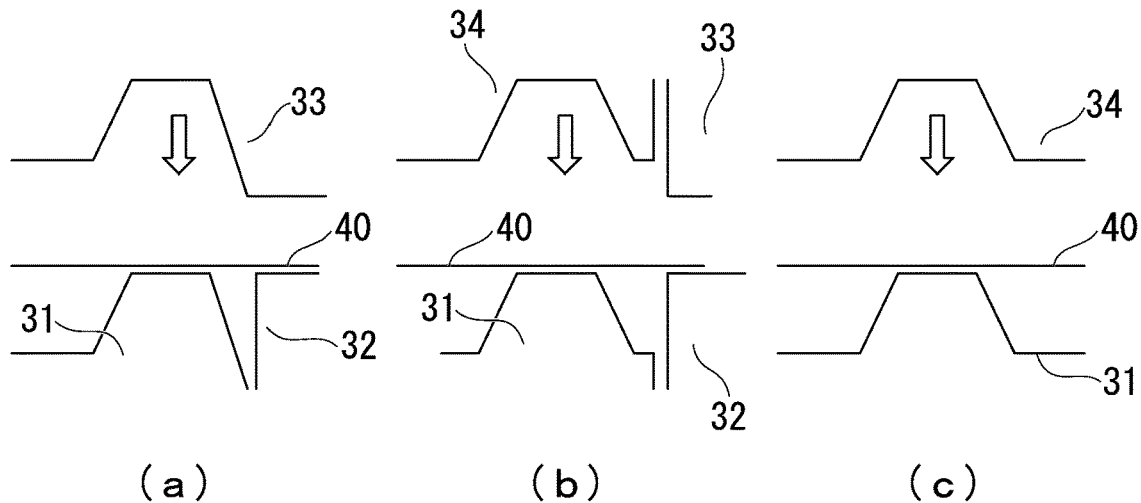
FIG. 21 is a schematic cross-sectional view showing the movement of a die and a blank holder, and the deformation behavior of the blank in each of the cross sections of portions which are to become the first portion, the corner portion, and the second portion of the lower A pillar outer panel during the forming by the manufacturing device of the first embodiment.
Figure 22:
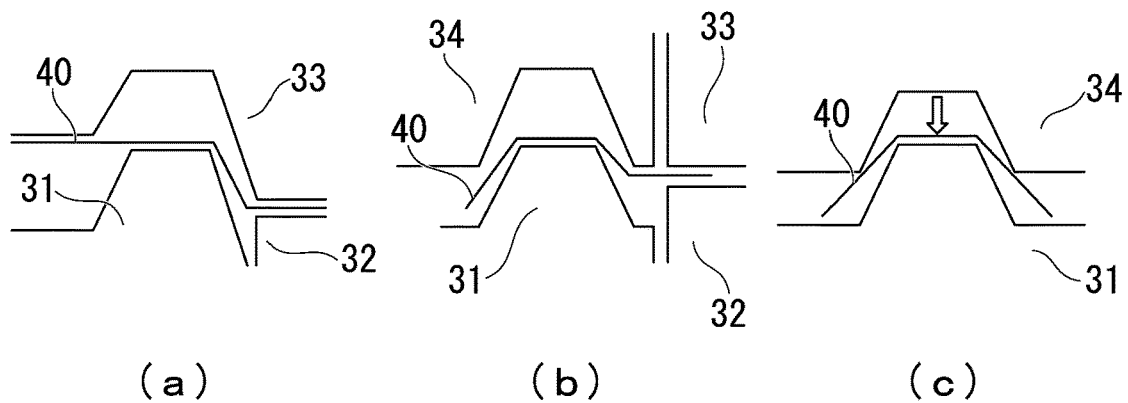
FIG. 22 is a schematic cross-sectional view showing the movement of the die and the blank holder, and the deformation behavior of the blank in each of the cross sections of the portions which are to become the first portion, the corner portion, and the second portion of the lower A pillar outer panel during the forming by the manufacturing device of the first embodiment.
Figure 23:
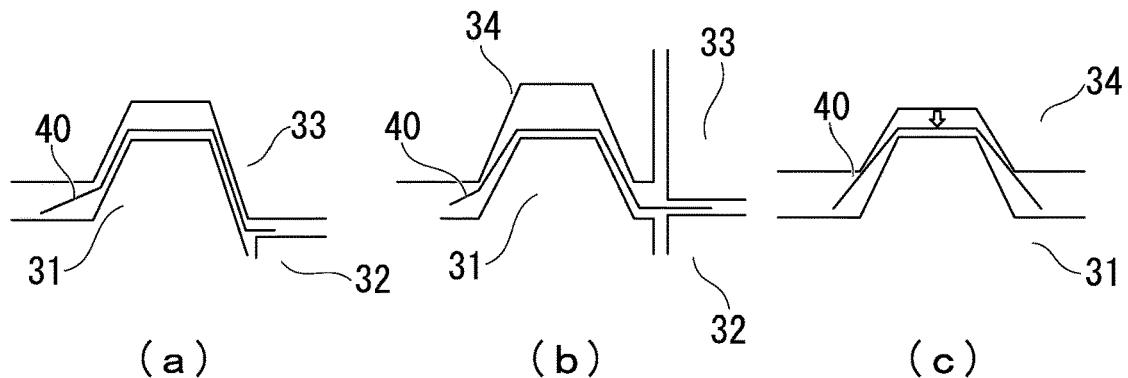
FIG. 23 is a schematic cross-sectional view showing the movement of the die and the blank holder, and the deformation behavior of the blank in each of the cross sections of the portions which are to become the first portion, the corner portion, and the second portion of the lower A pillar outer panel during the forming by the manufacturing device of the first embodiment.
Figure 24:
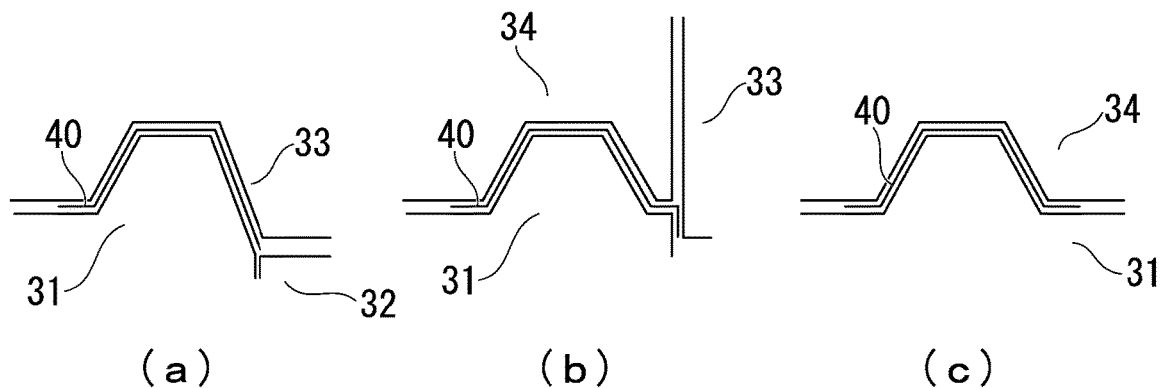
FIG. 24 is a schematic cross-sectional view showing the movement of the die and the blank holder, and the deformation behavior of the blank in each of the cross sections of the portions which are to become the first portion, the corner portion, and the second portion of the lower A pillar outer panel during the forming by the manufacturing device of the first embodiment.

(a) of FIG. 21, (a) of FIG. 22, (a) of FIG. 23, and (a) of FIG. 24 are views showing the movement of the die 33 and the blank holder 32, and the deformation behavior of the blank 40 in the cross section perpendicular to the longitudinal direction of the portion which is to become the first portion 11 of the lower A pillar outer panel 10.

(b) of FIG. 21, (b) of FIG. 22, (b) of FIG. 23, and (b) of FIG. 24 are views showing the movement of the die 33 and the blank holder 32, and the deformation behavior of the blank 40 in the cross section perpendicular to the longitudinal direction of the portion which is to become the corner portion 12 of the lower A pillar outer panel 10.

(c) of FIG. 21, (c) of FIG. 22, (c) of FIG. 23, and (c) of FIG. 24 are views showing the movement of the bending die 34, and the deformation behavior of the blank 40 in the cross section perpendicular to the longitudinal direction of the portion which is to become the second portion 13 of the lower A pillar outer panel 10.

In FIGS. 21 to 24, (a) of FIG. 21, (b) of FIG. 21, and (c) of FIG. 21 show the positional relationship in each cross section at the same time.

(a) of FIG. 21, (b) of FIG. 21, and (c) of FIG. 21 show a state in which the blank 40 is placed on a punch bottom surface 31b.

Similarly, (a) of FIG. 22, (b) of FIG. 22, and (c) of FIG. 22 show the positional relationship in each cross section at the same time.

In (a) of FIG. 22 and (b) of FIG. 22, the end portion of the blank 40 is sandwiched between the die 33 and the blank holder 32 and is deformed. In (c) if FIG. 22, the blank 40 is bent with the linear shape in the cross section.

(a) of FIG. 23, (b) of FIG. 23, and (c) of FIG. 23 show the positional relationship in each cross section at the same time.

(a) of FIG. 24, (b) of FIG. 24, and (c) of FIG. 24 show the positional relationship in each cross section at the same time.

In (a) of FIG. 24, the end portion of the blank 40 is drawn out such that the vertical wall 15 and the vertical wall 15 including the third outwardly-extending flange 20 are formed. In (b) of FIG. 24, the vertical wall 15, the second outwardly-extending flange 18, and the vertical flange 17 of the corner portion 12 are formed, and the vertical wall 15 and the vertical wall 15 including the third outwardly-extending flange 20 are formed. In (c) of FIG. 24, the vertical walls 15 respectively including the first outwardly-extending flange 16 and the third outwardly-extending flange 20 are formed.

In the manufacturing method according to the present embodiment, as for hot pressing conditions, heating at 900° C. (a temperature of at least at $Ac_3$ point or higher) for four minutes is preferable. The cooling rate by the die is preferably a cooling rate of 30° C./s or more, and in order to achieve this cooling rate, a cooling pipe may be installed in the die.

In the present embodiment, as the chemical composition of the blank 40, the amount of C is 0.090 to 0.40 mass %, the amount of Mn is 1.0 to 5.0 mass %, and the amount of B is 0.00050 to 0.05 mass %, whereby the strength of the hot-stamping formed article can be secured.

Second Embodiment

Next, another embodiment of a device and a method for manufacturing a hot-stamping formed article according to the present invention will be described.

The hot-stamping formed article manufactured by the manufacturing device and manufacturing method of the second embodiment may have the same configuration as the hot-stamping formed article according to the first embodiment. The following second embodiment is the same as the first embodiment except for the configuration described below.

(2-1) Manufacturing Device

In a manufacturing device 30 according to the first embodiment, a holder working surface 32a where the blank holder 32 comes into contact with the blank 40 and a die working surface where the die 33 comes into contact with the blank 40 are both flat horizontal surfaces.

As shown in FIG. 20, as the forming progresses, the deformation behavior of a restraint portion 40-1 of the blank 40 restrained by the holder working surface 32a and the die working surface, and the deformation behavior of a bent portion 40-2 of the blank 40 subjected to bending forming by the punch 31 and the bending die 34 are different.

According to the manufacturing device and the manufacturing method according to the second embodiment, the generation of cracks and wrinkles in a boundary portion 40-3 can be suppressed regardless of the manufacturing conditions such as the strength and sheet thickness of the blank 40, the height of the vertical wall 15, and the like.

Figure 25:
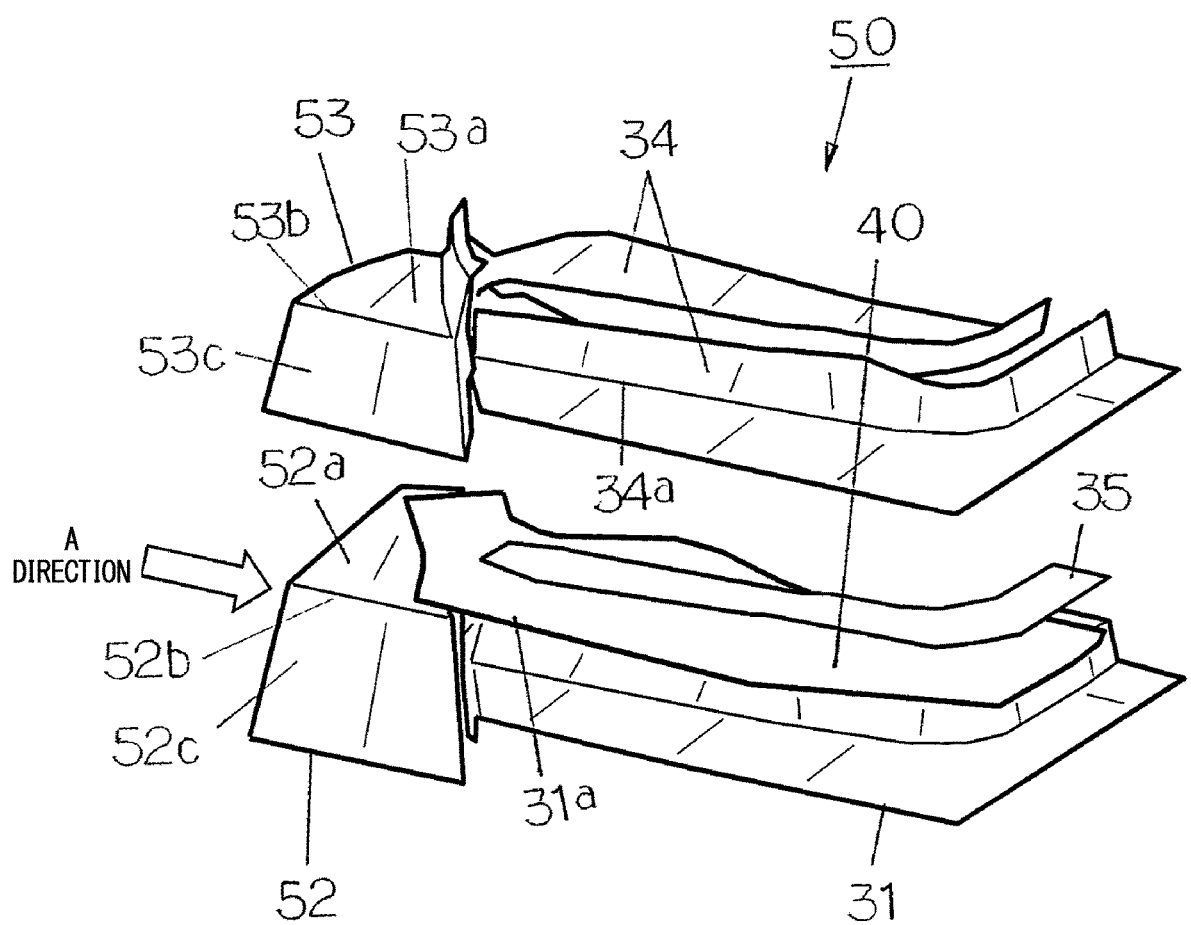
FIG. 25 is a schematic perspective view showing the manufacturing device of the second embodiment.
Figure 26:
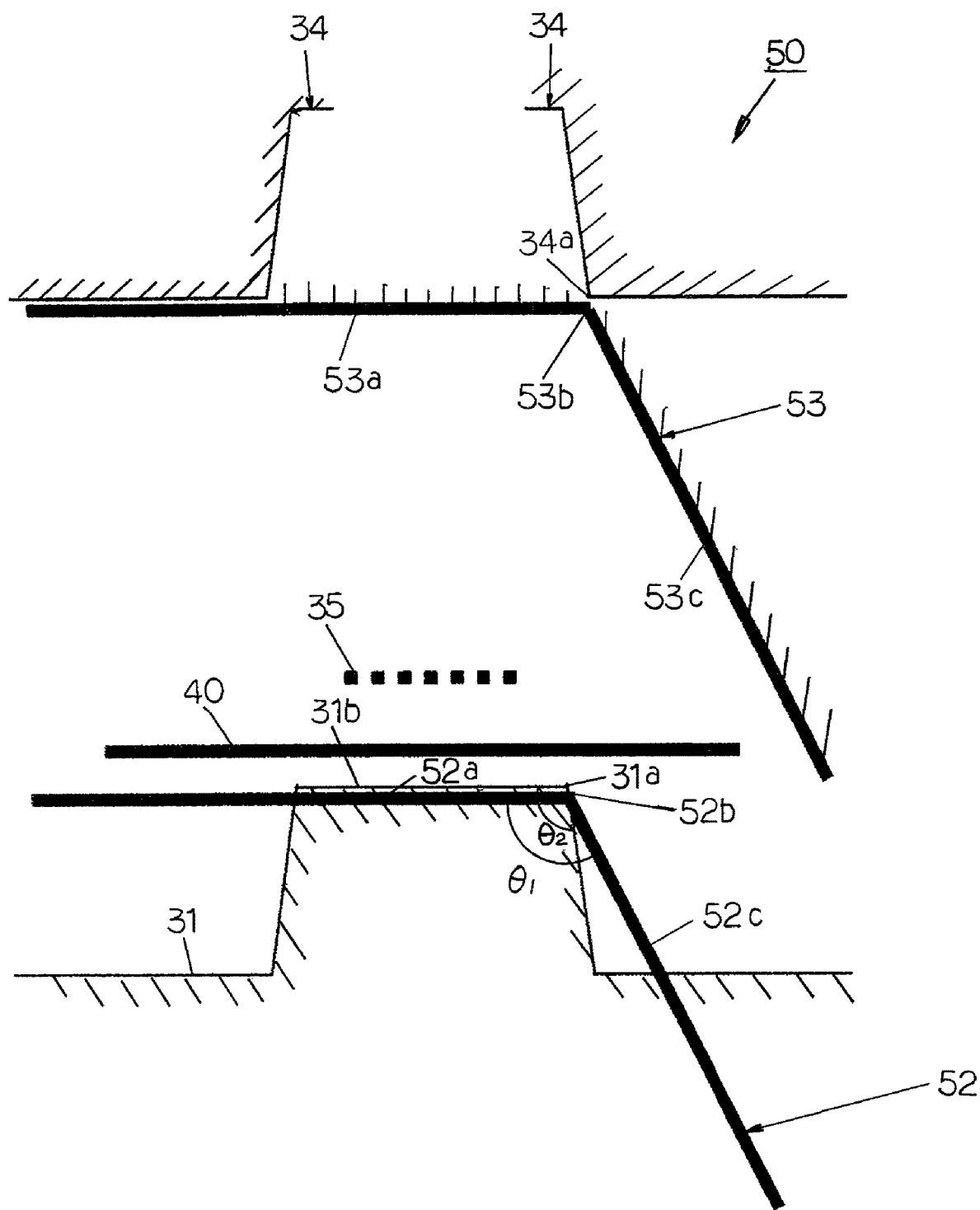
FIG. 26 is a schematic view showing an initial die arrangement of a manufacturing device of a second embodiment as viewed from in an A direction in FIG. 25.
Figure 27:
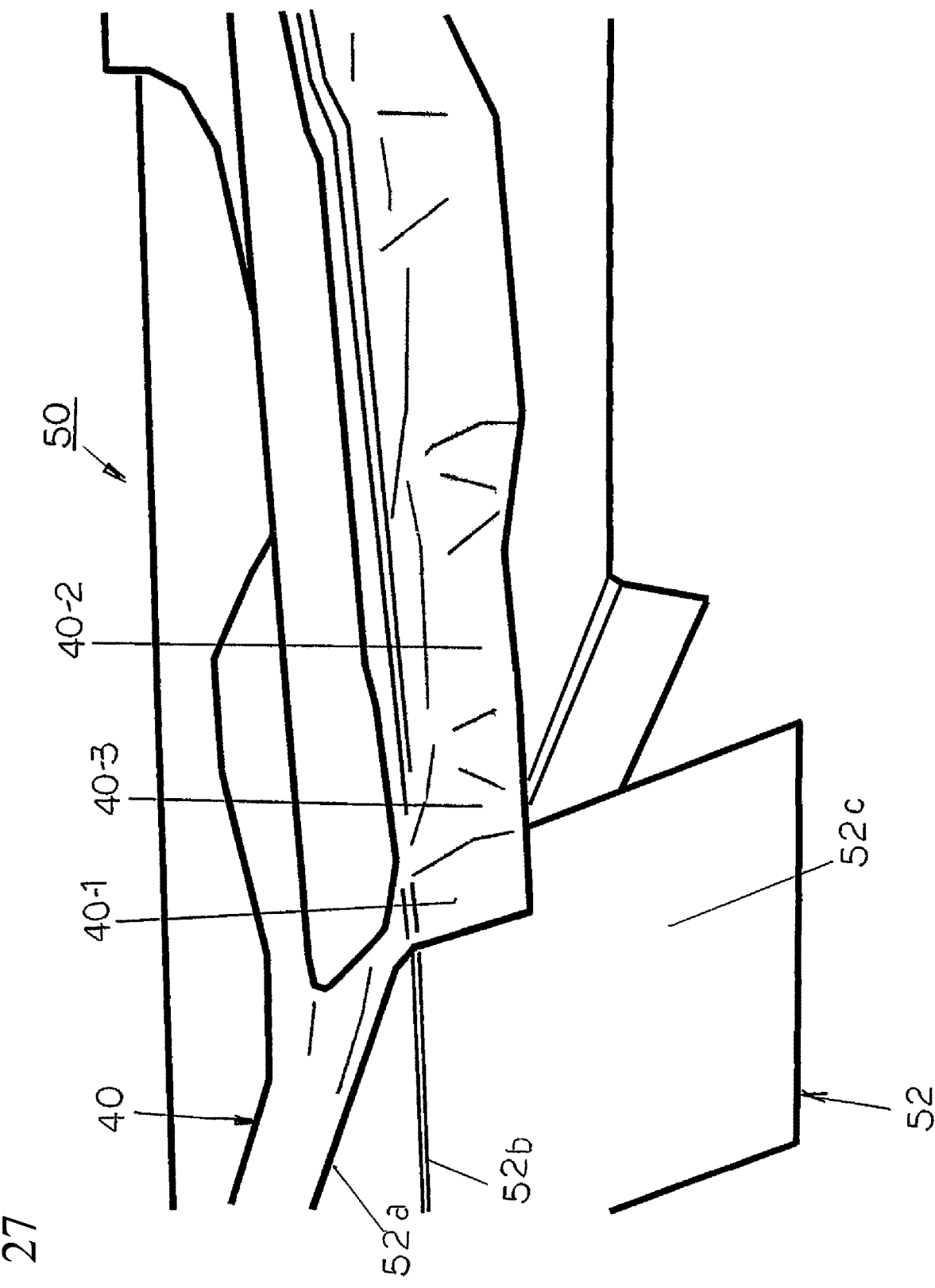
FIG. 27 is a schematic perspective view showing a deformed state of a blank during forming by the manufacturing device of the second embodiment.

FIG. 25 is an explanatory view showing a manufacturing device 50 of the second embodiment, FIG. 26 is an explanatory view showing an initial die arrangement of the manufacturing device 50 as viewed in the A direction in FIG. 25, and FIG. 27 is an enlarged explanatory view showing a deformed state of the blank during forming by the manufacturing device 50.

In the description of the second embodiment, parts of the manufacturing device 50 that are different from the manufacturing device 30 will be described, parts that are the same as those of the manufacturing device 30 will be denoted by the same reference numerals in the drawings, and overlapping descriptions will be omitted. In addition, although the manufacturing device 50 of the second embodiment uses the pad 35, the pad 35 may not be used.

In the manufacturing device 50 according to the second embodiment, for the purpose of further suppressing the generation of cracks and wrinkles in the boundary portion 40-3, as shown in FIGS. 25 to 28, a die 53 includes a first surface 53a, a bent portion 53b continuous to the first surface 53a, and a second surface 53c continuous to the bent portion 53b, and the blank holder 52 includes a first surface 52a, a bent portion 52b continuous to the first surface 52a, and a second surface 52c continuous with the bent portion 52b.

The respective first surfaces 53a and 52a of the die 53 and the blank holder 52 abut on and sandwich at least a part of the portion of the blank 40 which is to be formed into the vertical wall 15 located on the outer peripheral side of the corner portion 12 out of the two vertical walls 15 in the first portion 11 and the corner portion 12.

The respective second surfaces 53c and 52c of the die 53 and the blank holder 52 are arranged so as to be inclined in a direction away from the bending die 34 with respect to the first surfaces 53a and 52a.

As shown in FIG. 26, it is desirable that the bent portion 53b of the die 53 is provided at a height position near the height position of a bending ridge line portion 34a of the bending die 34, and the bent portion 52b of the blank holder 52 is provided at a height position in the vicinity of the height position of a punch shoulder radius portion 31a of the punch 31 in order to prevent the generation of cracks and wrinkles in the boundary portion 40-3.

As shown in FIG. 26, it is desirable that the inclination angle $\theta_1$ of the second surface 52c with respect to the first surface 52a in the blank holder 52 is equal to or more than (the inclination angle $\theta_2$ of the punch shoulder radius portion 31a of the punch 31−30 degrees) and equal to or less than (the inclination angle $\theta_2$ of the punch shoulder radius portion 31a of the punch 31+30 degrees) in order to prevent the generation of cracks and wrinkles in the boundary portion 40-3.

As shown in FIG. 26, it is desirable that the first surface 52a of the blank holder 52 is present at a height position substantially coincident with the height position of the punch bottom surface 31b of the punch 31 when the bending die 34 abuts on the blank 40 in order to prevent the generation of cracks and wrinkles in the boundary portion 40-3.

Furthermore, as shown in FIG. 26, it is desirable that the first surface 53a of the die 53 is present at a height position substantially coincident with a plane on which the bending ridge line portion 34a of the bending die 34 is present when the die 53 abuts on the blank 40 in order to prevent the generation of cracks and wrinkles in the boundary portion 40-3.

The manufacturing device 50 is configured as described above.

(2-2) Manufacturing Method

In the manufacturing device 50, the second surfaces 53c and 52c are respectively formed in the die 53 and the blank holder 52. For this reason, drawing is performed by the punch 31, the die 53, and the blank holder 52 and bending forming is performed by the punch 31 and the bending die 34 while the portion of the blank 40 restrained by the second surfaces 53c and 52c and the portion of the blank 40 subjected to the bending forming by the punch 31 and the bending die 34 during the forming simultaneously collapse.

Therefore, in the boundary portion 40-3, no level difference is caused in the boundary portion 40-3 between the restraint portion 40-1 of the blank 40 restrained by the second surfaces 53c and 52c during the forming and the bent portion 40-2 of the blank 40 subjected to the bending forming by the punch 31 and the bending die 34 during the forming.

Here, "to cause a level difference" means that in a range of 30 mm across a boundary portion between the portion of the blank subjected to the bending portion (bent portion) and the portion of the blank subjected to the drawing (drawn portion), the difference in the average position in the pressing direction between the bent portion and the drawn portion exceeds a predetermined amount, for example, 20 mm.

More specifically, in the blank 40 during the forming, the difference in the pressing direction between the end portion of the portion restrained by the respective second surfaces 53c and 52c of the die 53 and the blank holder 52 and the end portion of the portion which is subjected to the bending forming by the punch 31 and the bending die 34 so as to be formed into the first outwardly-extending flange 16 may be 20 mm or less. This difference is more preferably 15 mm or less, and even more preferably 10 mm or less.

Furthermore, the difference between the end portion and the end portion in the pressing direction may be 20 times or less, more preferably 15 times or less, and even more preferably 10 times or less the sheet thickness of the blank 40.

Here, the end portion and the end portion are defined as end portions of the blank 40 at positions of 30 mm from the boundary portion between the portion of the blank subjected to the bending forming (bent portion) and the portion of the blank subjected to the drawing (drawn portion).

Next, the movement of the die 53 and the blank holder 52 and the deformation behavior of the blank 40 in the manufacturing method according to the present embodiment will be described.

FIGS. 28 to 31 are view showing the movement of the die 53 and the blank holder 52, and the deformation behavior of the blank 40 in each of the cross sections of the portions which are to become the first portion 11, the corner portion 12, and the second portion 13 of the lower A pillar outer panel 10.

Figure 28:
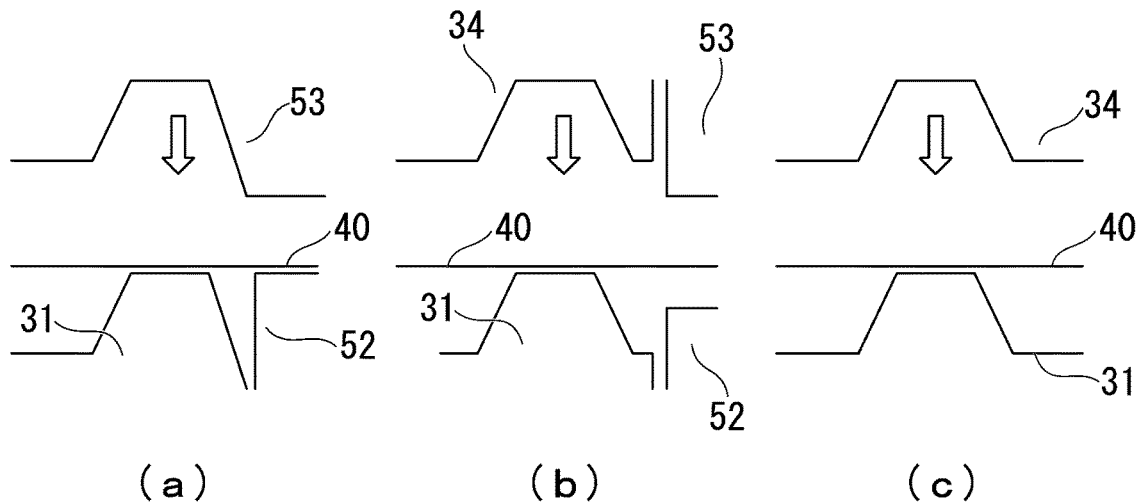
FIG. 28 is a schematic cross-sectional view showing the movement of the die and the blank holder, and the deformation behavior of the blank in each of the cross sections of the portions which are to become the first portion, the corner portion, and the second portion of the lower A pillar outer panel during the forming by the manufacturing device of the second embodiment.
Figure 29:
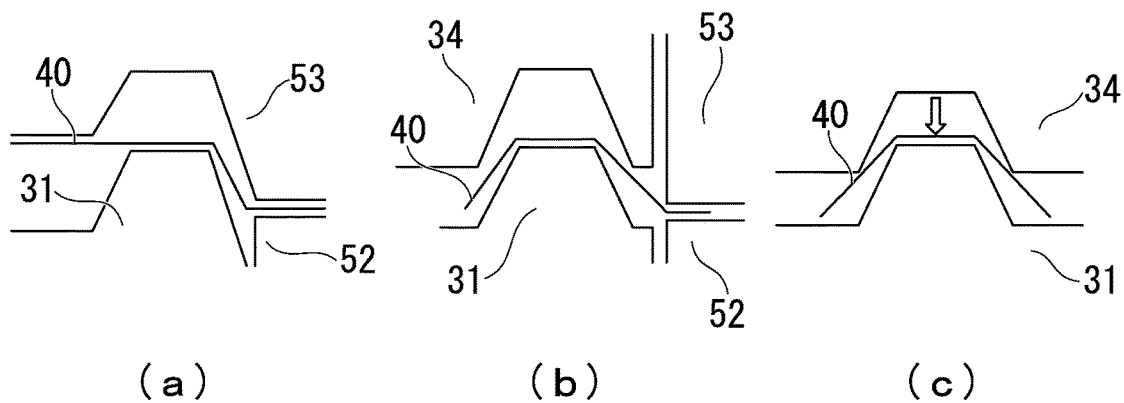
FIG. 29 is a schematic cross-sectional view showing the movement of the die and the blank holder, and the deformation behavior of the blank in each of the cross sections of the portions which are to become the first portion, the corner portion, and the second portion of the lower A pillar outer panel during the forming by the manufacturing device of the second embodiment.
Figure 30:
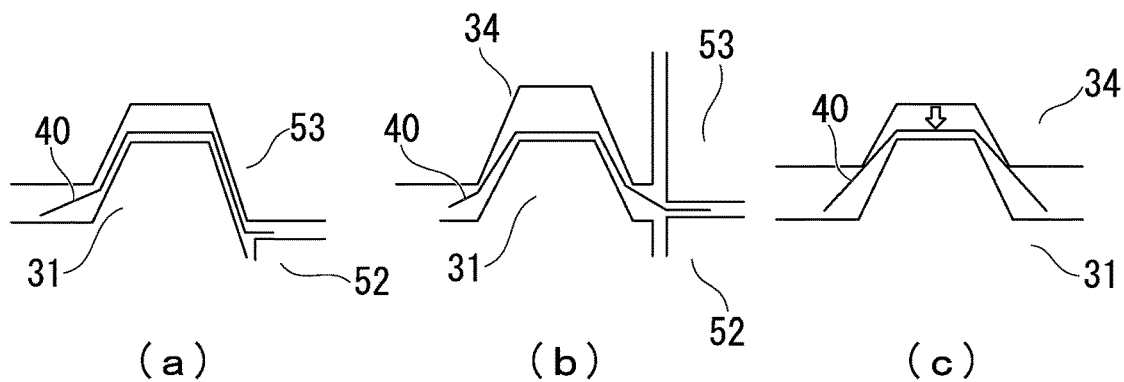
FIG. 30 is a schematic cross-sectional view showing the movement of the die and the blank holder, and the deformation behavior of the blank in each of the cross sections of the portions which are to become the first portion, the corner portion, and the second portion of the lower A pillar outer panel during the forming by the manufacturing device of the second embodiment.

(a) of FIG. 28, (a) of FIG. 29, (a) of FIG. 30, and (a) of FIG. 30 are views showing the movement of the die 53 and the blank holder 52, and the deformation behavior of the blank 40 in the cross section perpendicular to the longitudinal direction of the portion which is to become the first portion 11 of the lower A pillar outer panel 10.

Figure 31:
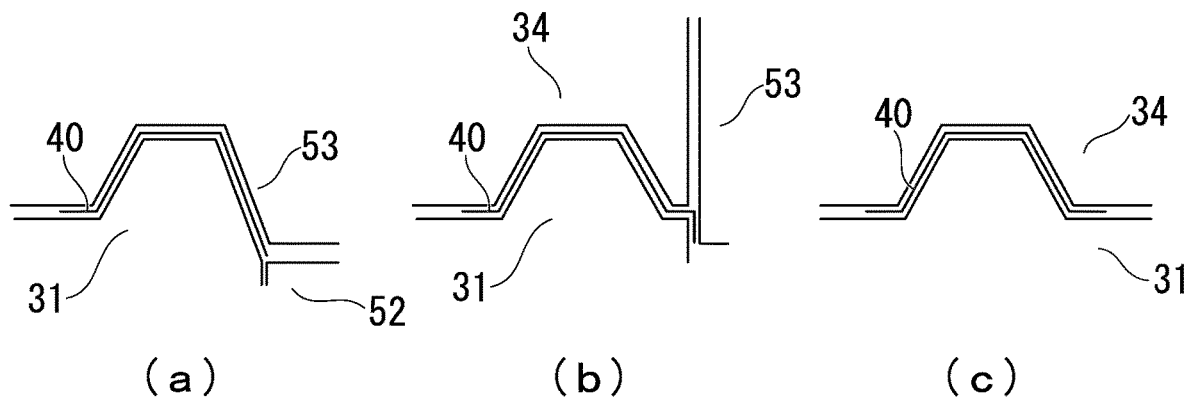
FIG. 31 is a schematic cross-sectional view showing the movement of the die and the blank holder, and the deformation behavior of the blank in each of the cross sections of the portions which are to become the first portion, the corner portion, and the second portion of the lower A pillar outer panel during the forming by the manufacturing device of the second embodiment.

(b) of FIG. 28, (b) of FIG. 29, (b) of FIG. 30, and (b) of FIG. 31 are views showing the movement of the die 53 and the blank holder 52, and the deformation behavior of the blank 40 in the cross section perpendicular to the longitudinal direction of the portion which is to become the corner portion 12 of the lower A pillar outer panel 10.

(c) of FIG. 28, (c) of FIG. 29, (c) of FIG. 30, and (c) of FIG. 31 are views showing the movement of the bending die 34, and the deformation behavior of the blank 40 in the cross section perpendicular to the longitudinal direction of the portion which is to become the second portion 13 of the lower A pillar outer panel 10.

In FIGS. 28 to 31, (a) of FIG. 28, (b) of FIG. 28, and (c) of FIG. 28 show the positional relationship in each cross section at the same time.

(a) of FIG. 28, (b) of FIG. 28, and (c) of FIG. 28 show a state in which the blank 40 is placed on the punch bottom surface 31b.

(a) of FIG. 29, (b) of FIG. 29, and (c) of FIG. 29 show the positional relationship in each cross section at the same time.

In (a) of FIG. 29 and (b) of FIG. 29, the end portion of the blank 40 is sandwiched between the die 53 and the blank holder 52 and is deformed. In (c) of FIG. 29, the blank 40 is bent with the linear shape in the cross section. Here, it can be seen that there is no difference between the position of the end portion of the blank 40 in (b) of FIG. 29 in the pressing direction and the position of the end portion of the blank 40 in (c) of FIG. 29 in the pressing direction.

(a) of FIG. 30, (b) of FIG. 30, and (c) of FIG. 30 show the positional relationship in each cross section at the same time. Even in this state, a state is maintained in which there is no difference between the position of the end portion of the blank 40 in (b) of FIG. 30 in the press direction and the position of the end portion of the blank 40 in (c) of FIG. 30 in the press direction.

(a) of FIG. 31, (b) of FIG. 31, and (c) of FIG. 31 show the positional relationship in each cross section at the same time.

In (a) of FIG. 31, the end portion of the blank 40 is drawn out such that the vertical wall 15 and the vertical wall 15 including the third outwardly-extending flange 20 are formed. In (b) of FIG. 31, the vertical wall 15, the second outwardly-extending flange 18, and the vertical flange 17 of the corner portion 12 are formed, and the vertical wall 15 and the vertical wall 15 including the third outwardly-extending flange 20 are formed. In (c) of FIG. 31, the vertical walls 15 respectively including the first outwardly-extending flange 16 and the third outwardly-extending flange 20 are formed.

According to the manufacturing method according to the second embodiment, the lower A pillar outer panel 10 which is the hot-stamping formed article shown in FIG. 1 can be provided in one step without causing cracks and wrinkles regardless of the manufacturing conditions such as the strength and sheet thickness of the blank 40, the height of the vertical wall 15, and the like.

EXAMPLES

Hereinafter, examples of the present invention will be described.

Experimental Example 1

The rigidity and collision characteristics of the hot-stamping formed article were evaluated by Computer Aided Engineering (CAE). Using a general purpose FEM code L:S-DYNA ver 971, collision analysis and rigidity analysis were performed.

Figure 32:
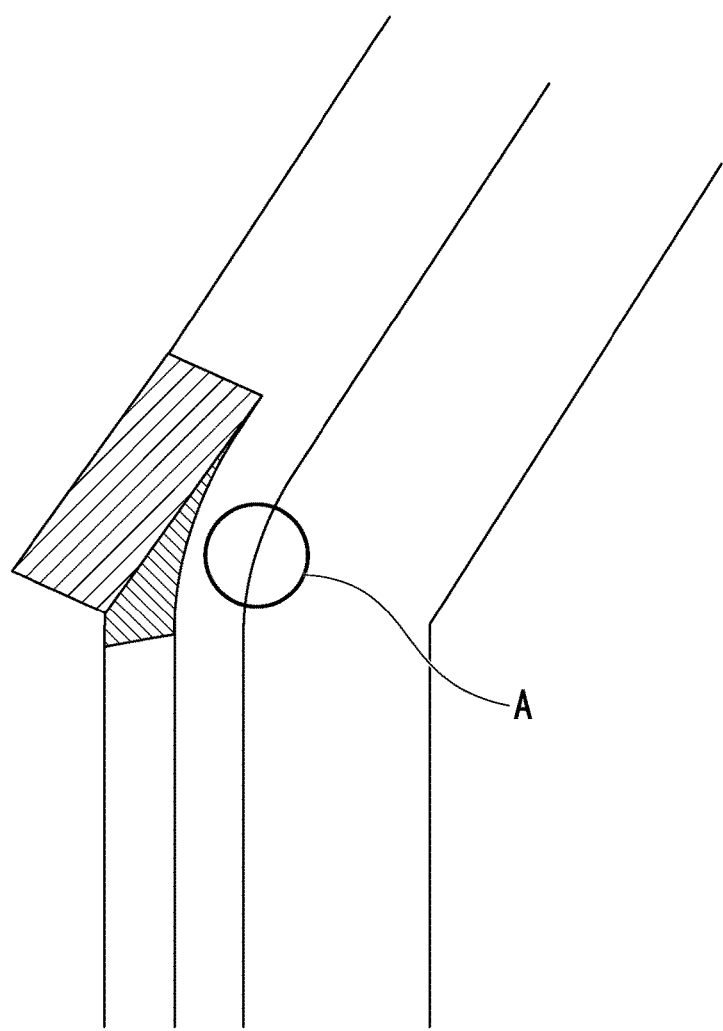
FIG. 32 is a schematic perspective view in the vicinity of the corner portion of the lower A pillar outer panel showing an evaluation object of collision analysis.

As an evaluation object of the collision analysis, two types of lower A pillar outer panels having different thickness reduction ratios in a portion near the top sheet of the vertical wall located on the outer peripheral side of the corner portion, in the A portion in FIG. 32, that is, in the corner portion (Example 1 and Comparative Example 1).

The width of the vertical flange of the lower A pillar outer panel of Example 1 was 20 mm, and the width of the second outwardly-extending flange was 20 mm. In Example 1, the sheet thickness reduction ratio in the corner portion (the A portion in FIG. 32) was 10%. Each flange width of the lower A pillar outer panel of Comparative Example 1 was also the same as that of Example 1, but the sheet thickness reduction ratio in the corner portion was 26%.

The sheet thickness distribution of these lower A pillar outer panels was derived so as to have the above sheet thickness by performing forming analysis. In any example, a reference sheet thickness was set to 1.2 mm. In Example 1, a lower A pillar outer panel formed by the manufacturing method or the manufacturing device according to the above embodiment was used. In Comparative Example 1, a lower A pillar outer panel formed by a drawing method in the related art was used.

Figure 33:
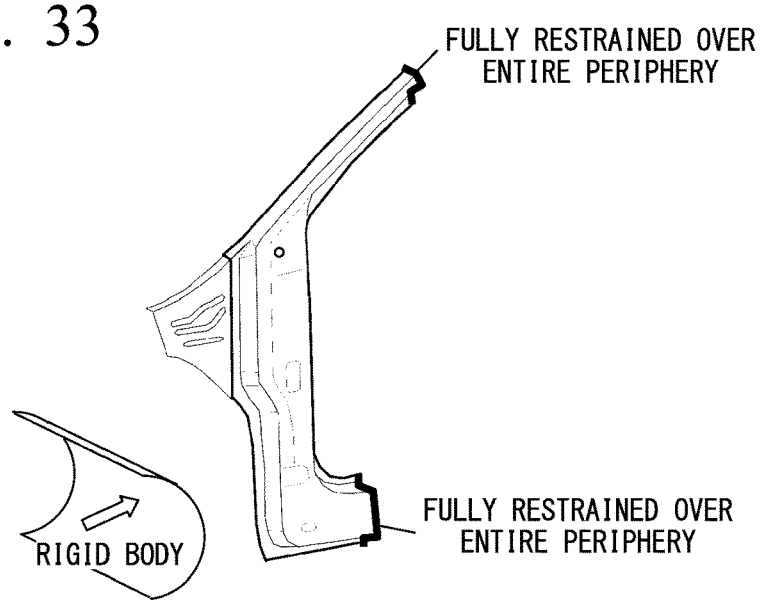
FIG. 33 is a schematic perspective view showing a collision characteristic evaluation method.

FIG. 33 shows a method for evaluating the collision characteristics. An inner member and the lower A pillar outer panel were joined by spot welding at intervals of 30 mm at a flange portion of the lower A pillar outer panel. As shown in FIG. 33, two end portions of the lower A pillar outer panel were fully restrained.

A rigid body was caused to collide at a speed of 20 km/h in a direction indicated by the arrow in FIG. 33. The sheet thickness distribution of the lower A pillar outer panel was derived by performing forming analysis. After the rigid body contacted the lower A pillar outer panel, the absorbed energy at a displacement of 50 mm was evaluated.

Figure 34:
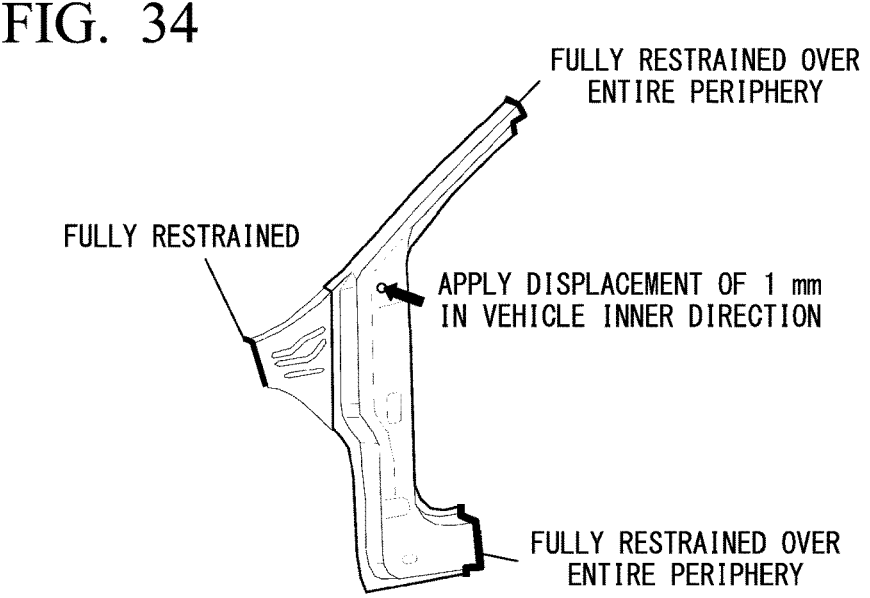
FIG. 34 is a schematic perspective view showing a rigidity evaluation method.

An evaluation method of rigidity is shown in FIG. 34. The inner member and the lower A pillar outer panel were joined by spot welding at intervals of 30 mm at the flange portion of the lower A pillar outer panel. As shown in FIG. 34, a total of three end portions including two end portions of the lower A pillar outer panel and an end portion of the inner member were fully restrained. The sheet thickness of the inner member was all 1.2 mm. A load was measured when a displacement of 1 mm was applied in a vehicle inner direction (the arrow direction) at the center of the top sheet of the corner portion.

The results of the sheet thickness reduction ratio, collision characteristics, and rigidity of the lower A pillar outer panel, which is the evaluation subject of the collision analysis, are shown in Table 1.

TABLE 1

| | Sheet thickness reduction ratio of A portion (%) | Collision characteristics of lower A pillar outer panel (kJ) | Rigidity of lower A pillar outer panel (N/mm) |
| --- | --- | --- | --- |
| Example 1 | 10 | 3.5 | 50 |
| Comparative Example 1 | 26 | 2.5 | 45 |

As shown in Table 1, it can be seen that Example 1, which has a smaller sheet thickness reduction ratio in the A portion, is superior in the collision characteristics and rigidity of the lower A pillar outer panel.

Experimental Example 2

Figure 35:
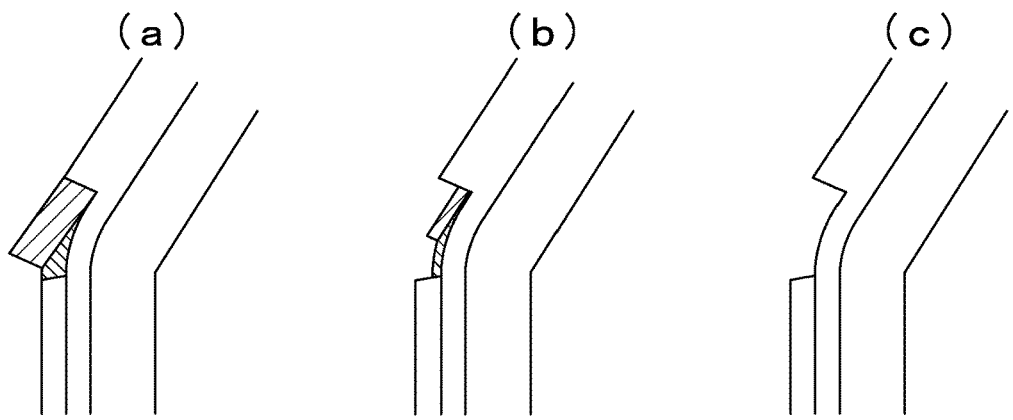
FIG. 35 is a schematic perspective view in the vicinity of a corner portion of a lower A pillar outer panel according to Experimental Example 2.
Figure 36:
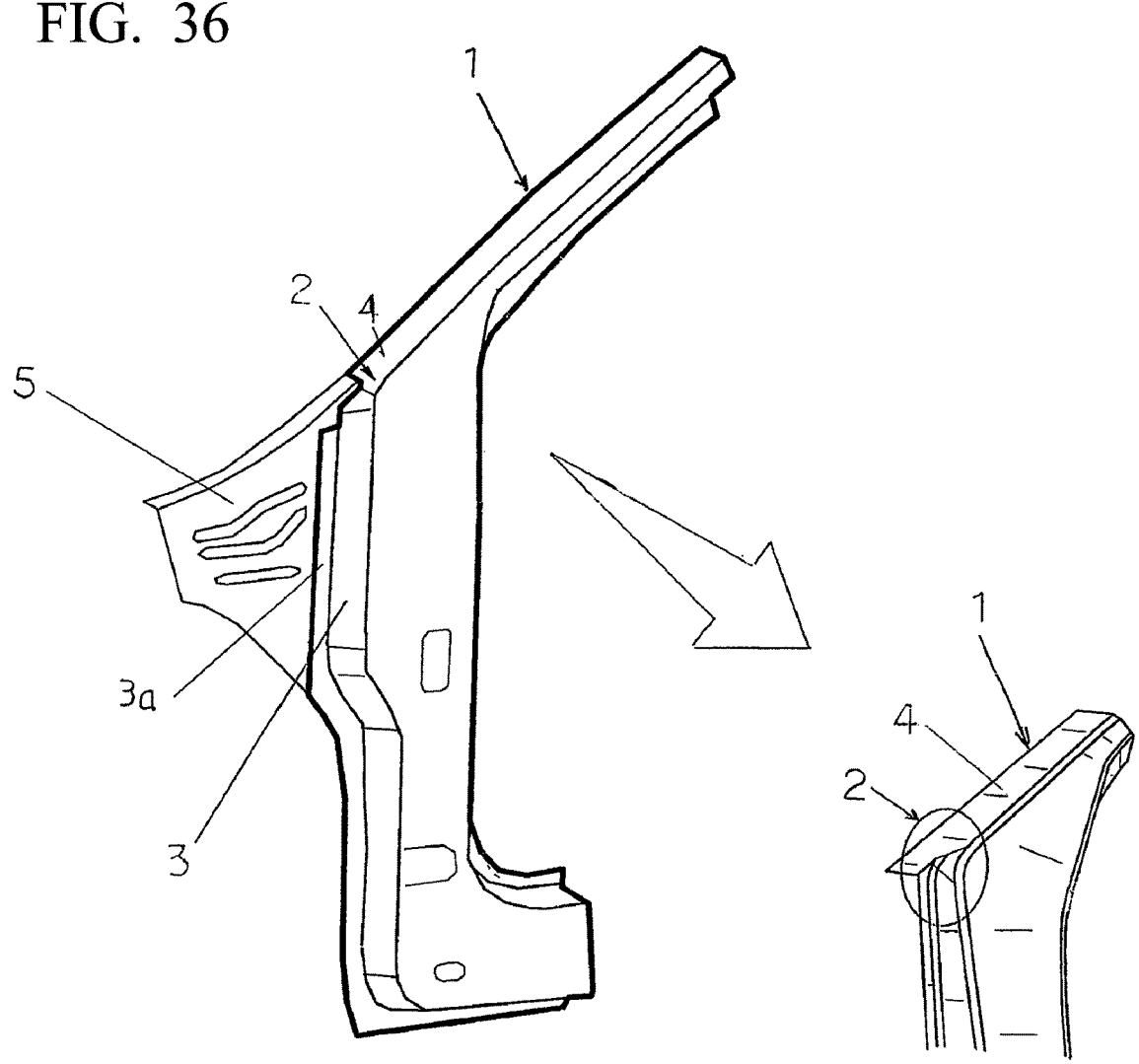
FIG. 36 is a perspective view showing an example according to the related art of a lower A pillar outer panel which is a component of a bodyside in a bodyshell of a vehicle.

The shapes of examples and comparative examples are shown in (a) to (c) of FIG. 35. In a lower A pillar outer panel of Example 2 shown in (a) of FIG. 35, the end portion of the vertical flange and the end portion of the vertical wall of the first portion are continuous without a level difference, and the end portion of the second outwardly-extending flange and the end portion of the first outwardly-extending flange are continuous without a level difference. In a lower A pillar outer panel of Example 3 shown in (b) of FIG. 35, the width of the vertical flange is 5 mm, and the width of the second outwardly-extending flange is 5 mm. Also in the case of Example 2, the transition portion in which the vertical flange and the second outwardly-extending flange are continuous is included.

In a lower A pillar outer panel of Comparative Example 2 shown in (c) of FIG. 35, there is no vertical flange and second outwardly-extending flange in the corner portion, and there is no transition portion. In other words, the lower A pillar outer panel of Comparative Example 2 in (c) of FIG. 35 has a cutout part over the entire periphery of the corner portion.

TABLE 2

|  | Width of vertical flange (mm) | Width of second outwardly-extending flange (mm) | Rigidity of formed article (N/mm) |
| --- | --- | --- | --- |
| Example 2 (transition portion present) | 20 | 20 | 50 |
| Example 3 (transition portion present) | 5 | 5 | 40 |
| Comparative Example 2 (transition portion absent) |  |  | 10 |

As can be seen from the results in Table 2, the formed article of Comparative Example 2 which does not include the vertical flange and the second outwardly-extending flange in the corner portion and does not include the transition portion is inferior in rigidity to the formed articles of Examples 2 and 3.

INDUSTRIAL APPLICABILITY

According to the present invention, it is possible to provide a hot-stamping formed article having high collision characteristics and rigidity while having a thin sheet thickness and a light weight, and a method and a device for manufacturing the hot-stamping formed article in which the hot-stamping formed article can be manufactured, which provides industrial usefulness.

BRIEF DESCRIPTION OF THE REFERENCE SYMBOLS 10 lower A pillar outer panel
11 first portion
12 corner portion
13 second portion
14 top sheet
15 vertical wall
16 first outwardly-extending flange
17 vertical flange
18 second outwardly-extending flange
19 transition portion
20 third outwardly-extending flange
30 manufacturing device
31 punch
31a punch shoulder radius portion
31b punch bottom surface
32 blank holder
33 die
34 bending die
34a bending ridge line portion
40 blank
50 manufacturing device
52 blank holder
52a first surface
52b bent portion
52c second surface
53 die
53a first surface
53b bent portion
53c second surface

The invention claimed is:

1. A hot-stamping formed article made of steel,
wherein the hot-stamping formed article has at least one of a tensile strength of 1200 MPa or more and a martensitic steel structure and includes a first portion, a corner portion, and a second portion, which are sequentially continuous from one end portion to an other end portion in a longitudinal direction,
each of the first portion, the corner portion, and the second portion includes a top sheet and two vertical walls connected to the top sheet continuously when viewed in a cross section perpendicular to the longitudinal direction, wherein the two vertical walls include an outer vertical wall located on an outer peripheral side of the corner portion and an inner vertical wall located on an inner peripheral side of the corner portion,
the second portion includes a first outwardly-extending flange adjacent to the outer vertical wall, and
the corner portion includes
a vertical flange extending from the outer vertical wall of the first portion,
a second outwardly-extending flange adjacent to the outer vertical wall, and
a transition portion in which the vertical flange and the second outwardly-extending flange are continuous.

2. The hot-stamping formed article according to claim 1, which is a lower A pillar outer panel.

3. A method for manufacturing the hot-stamping formed article according to claim 1 by performing press forming on a blank by a hot stamping method, the method comprising:
disposing the blank between a punch and a blank holder, a die disposed to face the blank holder, and a bending die;
supporting a portion of the blank which is to be formed into the top sheet by the punch;
sandwiching at least a part of a portion of the blank which is to be formed into the outer vertical wall in the first portion and the corner portion between the blank holder and the die; and
performing drawing on at least the part of the portion which is to be formed into the outer vertical wall by the punch, the blank holder and the die by moving the die and the bending die relatively close to the punch, and performing bending forming on a remaining part excluding a part to be drawn by the punch and the bending die.

4. The method for manufacturing the hot-stamping formed article according to claim 3,
wherein at least a part of the portion of the blank which is to be formed into the outer vertical wall is drawn out before reaching a bottom dead center, and sandwiching by the blank holder and the die is finished.

5. The method for manufacturing the hot-stamping formed article according to claim 3, further comprising:
a pad disposed to face the punch,
wherein the portion of the blank which is to be formed into the top sheet is sandwiched between the punch and the pad.

6. The method for manufacturing the hot-stamping formed article according to claim 3,
wherein the die and the blank holder respectively include first surfaces which abut on and sandwich the portion of the blank which is to be formed into the outer vertical wall in the first portion and the corner portion, bent portions continuous to the first surfaces, and second surfaces which are continuous to the bent portions and are inclined in a direction away from the bending die with respect to the first surfaces, and
the second surface of each of the die and the blank holder performs drawing on the blank along with bending forming by the punch and the bending die.

7. The method for manufacturing the hot-stamping formed article according to claim 6,
wherein a difference in a pressing direction between an end portion of a portion of the blank restrained by each of the second surfaces of the die and the blank holder during forming and an end portion of a portion which is subjected to the bending forming by the punch and the bending die and is to become the first outwardly-extending flange is 20 mm or less.

8. The method for manufacturing the hot-stamping formed article according to claim 6,
wherein the bent portion of the die is provided at a height position in the vicinity of a height position of a bending ridge line portion of the bending die, and the bent portion of the blank holder is provided at a height position in the vicinity of a height position of a punch shoulder radius portion of the punch.

9. The method for manufacturing the hot-stamping formed article according to claim 6,
wherein an inclination angle of the second surface with respect to the first surface in the blank holder is equal to or more than (an inclination angle of a punch shoulder radius portion of the punch −30 degrees) and equal to or less than (the inclination angle of the punch shoulder radius portion of the punch +30 degrees).

10. The method for manufacturing the hot-stamping formed article according to claim 6,
wherein the first surface of the blank holder is present at a height position substantially coincident with a height position of a punch bottom surface of the punch when the blank is sandwiched between the die and the blank holder.

11. The method for manufacturing the hot-stamping formed article according to claim 6,
wherein the first surface of the die is present at a height position substantially coincident with a height position of a plane on which a bending ridge line portion of the bending die is present when the blank is sandwiched between the die and the blank holder.

* * * * *